United States Patent [19]
Liang et al.

[11] Patent Number: 5,574,790
[45] Date of Patent: Nov. 12, 1996

[54] FLUORESCENCE AUTHENTICATION READER WITH COAXIAL OPTICS

[75] Inventors: Louis H. Liang, Los Altos, Calif.; Daniel A. Marinello, Burlington, Ky.; William J. Ryan, Underhill, Vt.; David Silverglate, Santa Cruz, Calif.; Donald L. Wray, Ocala, Fla.

[73] Assignee: Angstrom Technologies, Inc., Florence, Ky.

[21] Appl. No.: 575,729

[22] Filed: Dec. 18, 1995

Related U.S. Application Data

[60] Continuation-in-part of Ser. No. 383,785, Feb. 6, 1995, abandoned, which is a division of Ser. No. 127,250, Sep. 27, 1993, Pat. No. 5,418,855.

[51] Int. Cl.$^6$ .................................................. H04L 9/00
[52] U.S. Cl. .................. 380/23; 380/54; 380/59
[58] Field of Search ................... 380/23, 54, 59; 250/271, 556; 156/643; 235/491, 492; 283/88, 91, 92; 106/21; 382/7; 378/44; 340/825.34

[56] References Cited

U.S. PATENT DOCUMENTS

| | | | |
|---|---|---|---|
| 3,444,517 | 5/1969 | Rabinow | 340/146.3 |
| 3,473,027 | 10/1969 | Freeman et al. | 250/71 |
| 3,624,644 | 11/1971 | Higgins | 380/59 |
| 3,662,181 | 5/1972 | Hercher et al. | 250/219 D |
| 4,451,521 | 5/1984 | Kaule et al. | 428/199 |
| 4,642,526 | 2/1987 | Hopkins | 315/244 |
| 4,736,425 | 4/1988 | Jalon | 380/59 |
| 4,756,557 | 7/1988 | Kaule et al. | 283/85 |
| 4,833,311 | 5/1989 | Jalon | 235/491 |
| 4,891,505 | 1/1990 | Jalon | 235/491 |
| 4,908,516 | 3/1990 | West | 250/556 |
| 4,921,280 | 5/1990 | Jalon | 283/88 |
| 4,921,534 | 5/1990 | Jalon | 106/20 |
| 4,983,817 | 1/1991 | Dolash et al. | 235/462 |
| 5,005,873 | 4/1991 | West | 283/92 |
| 5,030,832 | 7/1991 | Williams et al. | 250/458.1 |
| 5,030,833 | 7/1991 | Nozaka et al. | 250/461.1 |
| 5,063,297 | 11/1991 | Hardenbrook et al. | 250/458.1 |
| 5,118,349 | 6/1992 | Jalon | 106/21 |
| 5,418,855 | 5/1995 | Liang et al. | 380/23 |

*Primary Examiner*—Salvatore Cangialosi
*Attorney, Agent, or Firm*—Theodore R. Touw

[57] ABSTRACT

A multiple-reader system for authentication of articles uses a first reader (400) which employs predetermined modulated illuminating light (20) and a multiplicity of discriminating variables, such as wavelengths (110), amplitudes (120), and time delays (140) relative to the modulated illuminating light (20) to characterize fluorescent light (70) detected from fluorescent indicia on the articles. The fluorescent indicia may also incorporate spatial distributions such as bar codes as discriminating features. Additional readers (410 and 420), which may be readers of fluorescent marks and/or readers of other indicia, are synchronized with the fluorescence reader by timing signals. The discriminating features may be reprogrammed by the user of the authentication system. Thus the discriminating features define a user-determined and programmable encryption of the articles' authentic identity. The outputs provided by individual readers (400, 410 and 420) are combined by a computer (85) programmed to produce the authentication result. The fluorescence authentication reader includes integration and synchronization of multiple readers of various types, an improved coaxial optics subsystem (450), and electronic circuitry with improved time-base stability, which cooperate in enhancing signal/noise ratio. The resultant stable triggering of the authentication output of the individual fluorescence reader, combined with time synchronization of the individual fluorescence reader with other readers, provides a reliable integrated multi-reader authentication system.

34 Claims, 16 Drawing Sheets

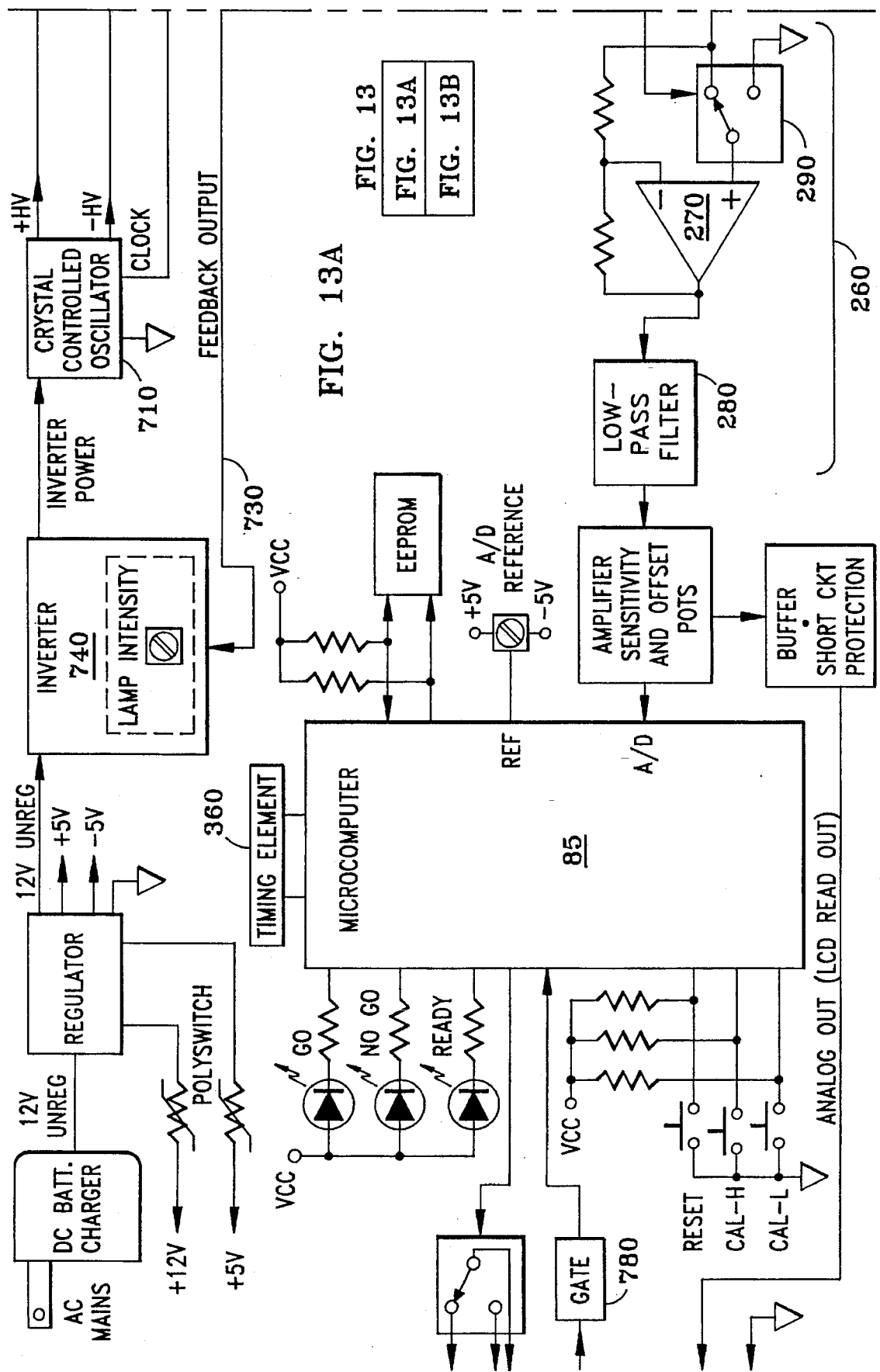

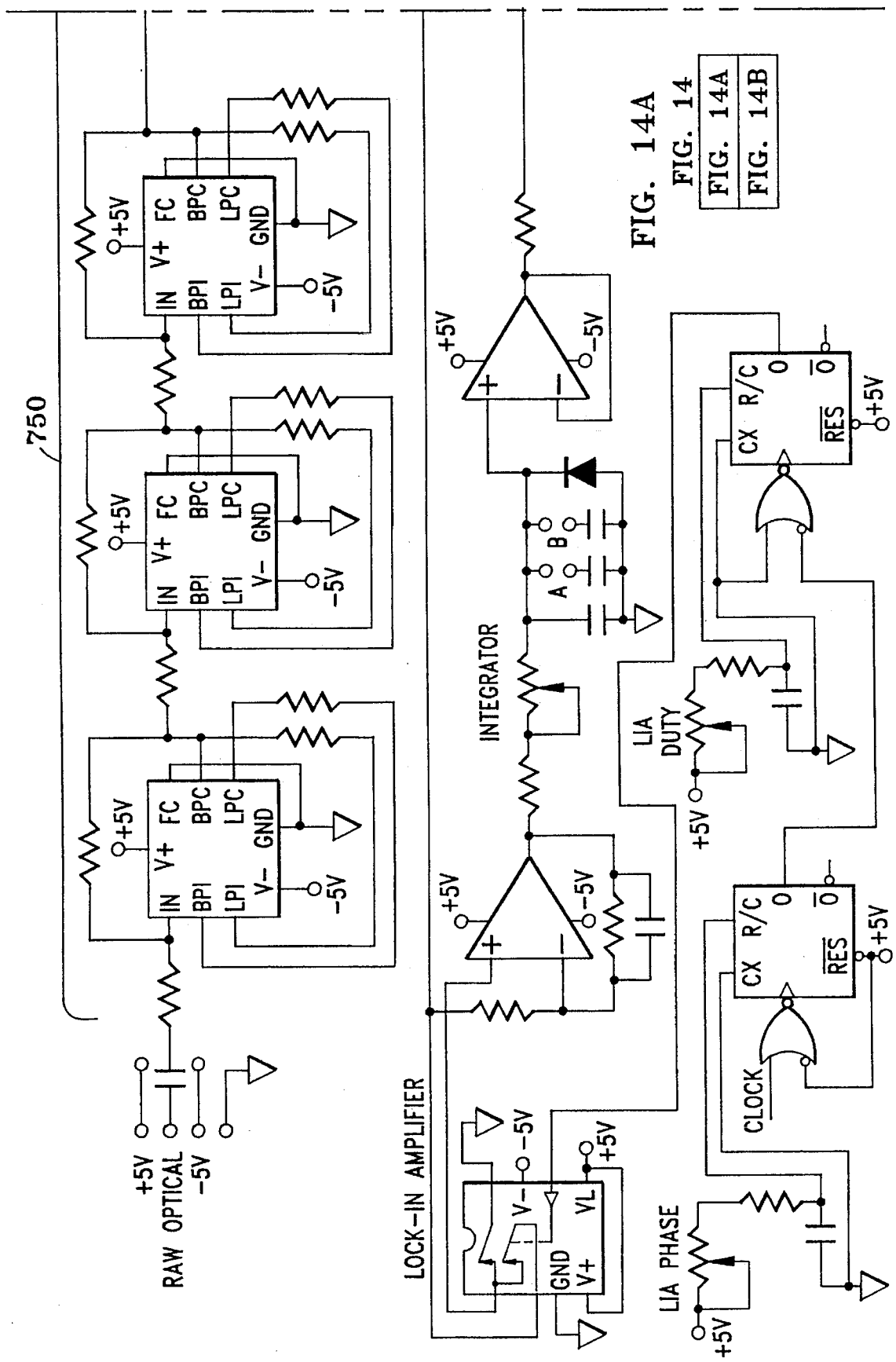

FLUORESCENCE AUTHENTICATION READER WITH COAXIAL OPTICS

This application is a continuation-in-part of U.S. patent application Ser. No. 08/383,785 filed Feb. 6, 1995, now abandoned, which is a division of U.S. patent application Ser. No. 08/127,250 filed Sep. 27, 1993, now U.S. Pat. No. 5,418,855.

TECHNICAL FIELD

This invention relates generally to systems for authenticating articles and more particularly to detection of fluorescent radiation from articles marked with materials that fluoresce when illuminated with non-visible radiation such as ultraviolet radiation.

BACKGROUND OF THE INVENTION

Many methods have been known in the prior art to authenticate valuable articles. Some known methods include imprinting on the articles a white-light hologram or imprinting reflective and diffractive indicia displaying distinctive images that are difficult to counterfeit. Other known methods include incorporation of distinctive fibers into the articles, such fibers being detectable by visual observation, microwave irradiation, or other means. U.S. Pat. No. 4,921,280 to Jalon describes fibers made luminescent by a dyeing process employing rare-earth compounds, which fibers may be incorporated into articles requiring authentication.

It is well-known in the prior art that documents may be authenticated by marking the documents with substances such as inks or dyes that appear invisible or relatively unnoticeable to the naked eye in ordinary visible illumination, but that fluoresce when illuminated with ultraviolet light, revealing marks that serve to identify the legitimate document. These methods depend on substances that are not easily or inexpensively identified by a counterfeiter, and not easily or inexpensively duplicated or mimicked by a counterfeiter. When using these methods, it is desirable to use substances such as dyes or inks that fluoresce in narrow spectral bands which are distinguishable by sufficiently narrow-band detectors, but not readily distinguishable by eye. In U.S. Pat. No. 4,146,792 to Stenzel et al., these methods are extended to include dyes containing rare-earth elements whose fluorescence is influenced by the chemical environment of the fluorescing atoms in a non-fluorescing matrix, and the detection is refined to include detection of predetermined fine structure in the line spectrum of emitted light. In this method, the spectral fine structure is built into the marking dyes by the formulation of the dyes, and the corresponding discrimination of fine spectral structure is fixed in the physical structure of the checking device by the sizes and positions of photocells cooperating with an optical dispersion element, particularly a narrow-bandwidth interference filter. Yet another class of authentication methods uses substances which fluoresce in the infrared portion of the electromagnetic spectrum when illuminated by light in the visible portion of the spectrum.

In U.S. Pat. No. 4,642,526 to Hopkins and assigned to the assignee of the present invention, a source of ultraviolet light is made self-modulating at a predetermined frequency. Detection of the secondary radiation, filtering of the detected signal, and demodulation of the filtered signal at the predetermined frequency allow the system of Hopkins' invention to detect the fluorescent marks despite interference from ambient light sources.

Marking products with indicia such as bar codes using fluorescent substances such as inks or dyes is also known in the prior art, both for the purposes described above and for providing identification on the products without detracting from the products' appearance as normally viewed in visible light. U.S. Pat. No. 4,983,817 to Dolash et al. describes methods and apparatus for reading bar codes printed with fluorescent substances, while compensating for variations in background reflectance over the area printed with the bar code. U.S. Pat. No. 5,030,833 to Nozaka et al. shows a method and device for detecting fluorescent substances using arithmetic combinations of signals from two or more light reception elements. U.S. Pat. No. 5,063,297 to Hardenbrook et al. shows an apparatus for detecting fluorescence of a luminescent material in which electrical responses from first and second photodetectors (respectively detecting target luminescence and source light) are electrically coupled to oppose each other and phase information is converted to an indication of the amount of fluorescence.

In many of the known authentication methods using fluorescence, the fluorescent identifying substance may be incorporated into the article during the article's manufacture instead of marking the article afterwards. One example is the incorporation of fluorescent substances such as dyes into paper during its manufacture and then using such paper for valuable documents.

While the various known methods of authenticating articles are useful for many purposes, there is a continuing need for improved fluorescence authentication reader methods and systems that are more readily adaptable by the user, that are reliable, and that provide fast authentication in the presence of optical and electrical noise and bright ambient lighting.

OBJECTS AND ADVANTAGES OF THE INVENTION

One object of this invention is an improved authentication system that can detect articles marked with fluorescent substances such as inks or dyes to determine whether or not the articles are authentic. A further object is an authentication system that combines improved and simplified optics, improved electrical circuits, improved programmable discrimination methods, and improved combination of multiple types of readers. A particular object of the invention is an improved authentication system that is adaptable by a user to re-program the discrimination criteria used by the authentication system. Related objects are reduced frequency drift, improved time-domain stability, and improved triggering reliability of an authentication system. A further object is an improved authentication system that performs reliably in the presence of optical and electrical noise, and is easy to set up, calibrate and verify. Another object is an authentication system having improved lifetime of its excitation source lamp, while compensating for lamp-to-lamp variations and for changes in light output that would otherwise occur as its lamp ages. A related object is an authentication system that has both manual and automatic illumination brightness control. Another object is an authentication system whose response can be matched with respect to particular fluorescent substances used for authentication. Yet another object is an authentication system that can be manufactured at relatively low cost with fewer components than heretofore, and can be made small enough and light enough to be easily portable. A further object is an authentication system that can read bar codes printed with substances such as inks which fluoresce under ultraviolet illumination, and also read normal visible bar codes, at high speed such as 50,000 scans per minute or more with improved reproducibility. A further object of the invention is an authentication system that can acquire and report to its user information, particularly statistical information, about the quality of articles to which it is directed. Other objects include methods of authenticating articles with improved sensitivity and reproducibility. Further important objects are authentication systems and methods using multiple readers of indicia to enhance security, synchronization among the multiple readers, and apparatus with enhanced signal/noise ratio in fluorescence detection. More specific related objects include simplified and more efficient optics for fluorescence authentication, and enhanced time stability of fluorescence detection triggering.

SUMMARY OF THE INVENTION

The present invention is based on the use of multi-dimensional and user-programmable discrimination criteria to detect and authenticate indicia on articles. The discrimination criteria may be programmed at the time of manufacture of the articles or later, and may be re-programmed by the user at the point of use of the authentication system at any later time. The same authentication systems can be used by many users, with each user having the capability to program discrimination criteria with the complexity and reliability appropriate to that user's needs and appropriate to the value of the articles to be authenticated.

The invention is particularly applicable to detection of counterfeit documents or other counterfeit products and detection of documents or other products which have been subjected to tampering, forging, or other unauthorized modification. Thus the invention is particularly useful for confirming the authenticity and integrity of articles, including valuable documents such as legal papers, identification cards, credit cards, licenses, passports, customs and immigration documents, and valuable mail. The invention can also be applied to quality control of products, providing quantitative and statistical information where the presence or quantity of particular materials is important. Some other examples of applications include label verification, safety seal verification, article alignment, and sorting of articles into two or more categories.

The various detection criteria used in various combinations by the authentication system of this invention include the wavelengths of fluorescent emission lines, the relative or absolute amplitudes of those emission lines, the time delays of emissions after pulsed illumination with non-visible light, and the spatial distributions of fluorescent materials on the article to be authenticated. The spatial distributions may be bar codes, for example. Or they may be any spatial distributions of marks, such as arrays of dots, characters to be recognized by optical character recognition, images such as half-tone images, signatures, fingerprints, etc.. The combinations of discrimination criteria are used as codes for identifying the authentic article. The indicia made on the articles may include "false" or intentionally misleading codes, i.e. codes that are not actually used as part of the identification criteria combination. For example, bar codes can be printed with fluorescent materials whose emission wavelengths are not tested by the authentication system. If the correct predetermined and programmed combination code is not detected, the authentication system produces a negative authentication result, which may be used to initiate further actions of the apparatus. The authentication system may include multiple readers, which may be multiple readers of fluorescent marks and/or readers of other indicia, and the information provided by the multiple readers may be combined to produce the authentication result.

The present invention improves significantly on the performance and repeatability of the authentication system of the earlier U.S. Pat. No. 5,418,855 to Liang et al. and assigned to the assignee of the present invention. The authentication system of the present invention incorporates all of the features of that system and incorporates further improvements, including novel simplified optics in which a conventional beam splitter is replaced with a coaxial optics subsystem, integration of multiple readers of various types, and improved electronic circuitry with improved time-base stability and synchronization among multiple readers, the various improvements cooperating to achieve more consistent and reliable authentication under a wider range of ambient conditions.

For some applications, the authentication system may optionally include mechanical apparatus to sort authenticated from non-authenticated articles, and may optionally include further apparatus, under some circumstances, to confiscate or destroy unauthenticated articles, e.g. counterfeit credit cards or the like. Alternatively, under some circumstances, the sorted unauthenticated articles may be visibly marked by optional marking means to prevent their continued unauthorized use.

DISCLOSURE OF THE INVENTION

Figure 1:
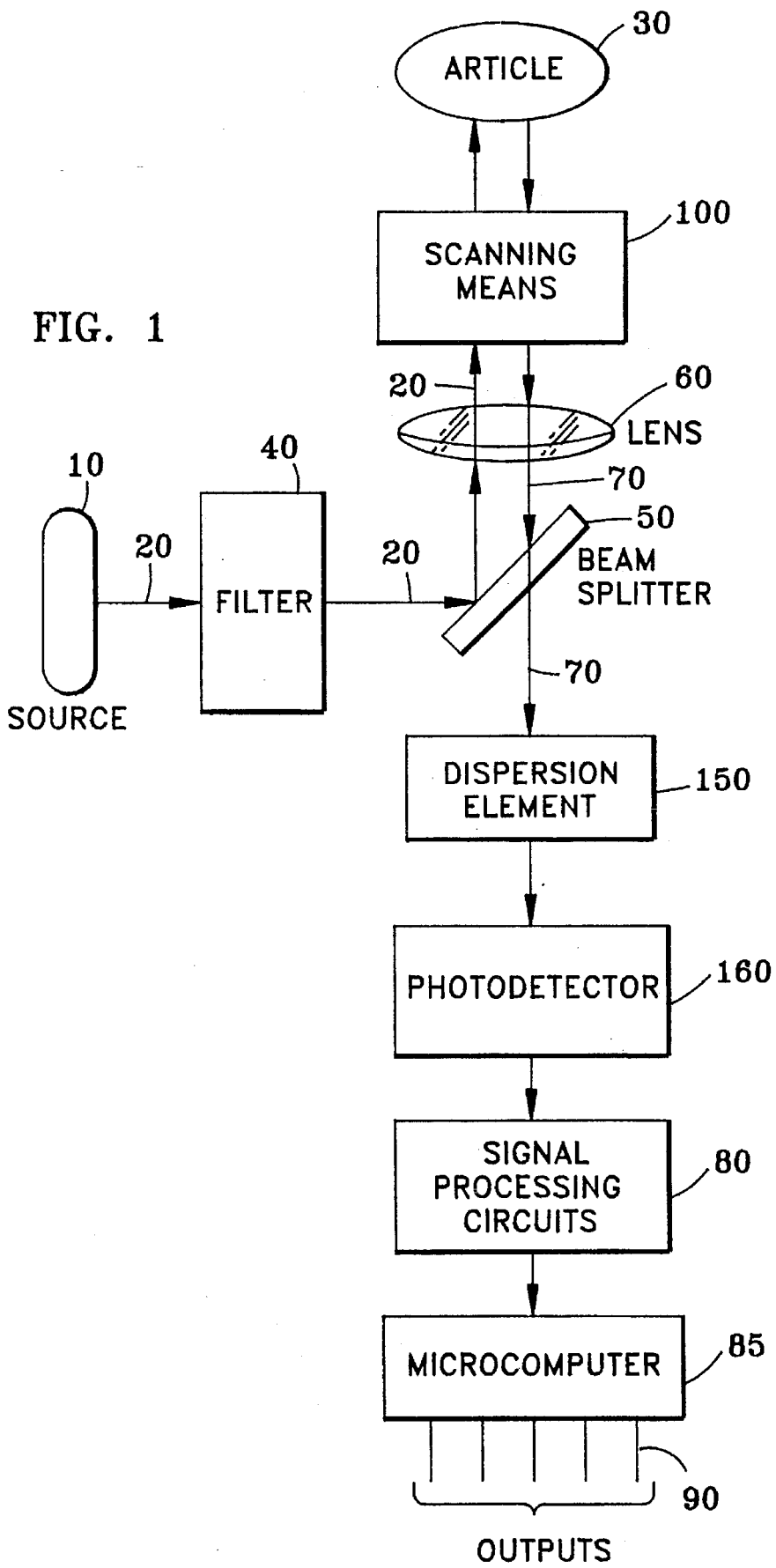
FIG. 1 illustrates an overall schematic diagram of an authentication system made according to the present invention.

In order to promote a clear understanding of the present invention, this description begins with a description of the overall apparatus and methods, as previously disclosed in U.S. Pat. No. 5,418,855, and including the description of FIGS. 1–5. Following that is a more detailed description of the improved system of present invention, including its preferred embodiments and the best mode of carrying out the invention, and including the description of FIGS. 6–16.

The authentication system of this invention requires that articles be marked with one or more substances such as dyes or inks which emit light (i.e. fluoresce) in one spectral region, such as the visible region, when illuminated with light in another spectral region, such as the ultraviolet region. Many dye and ink substances which fluoresce are known. Those particular fluorescent substances to be used with the authentication system of this invention are predetermined, and samples of those predetermined substances are used in predetermined concentrations to calibrate and program the authentication system.

In applications where it is desired to determine if articles have been modified, the fluorescent substances may be erasable. Thus, for example, on a check having erasable fluorescent substances printed in the amount field or signature field, erasure in those fields to modify the check would reduce the amount of fluorescent substance, and that reduction could be detected by a sufficiently sensitive authentication system.

In general, the authentication system of this invention has a "front-end" portion containing optical elements including a lamp which is a source of ultra-violet light for illuminating an article to be authenticated, a beam splitter, optional scanning means, one or more lenses or mirrors, one or more optical dispersion elements or filters, and one or more photodiodes. The front-end portion is electrically shielded from external electrical noise, where the shielding includes a conductive glass window over the photodiode or photodiodes, with electrical connection between the conductive window and the other shielding. This front-end portion works in cooperation with an electronic portion which provides an AC or pulsed energizing signal for the lamp, processes the electrical signal from the photodiode, provides for calibration of the electrical signal, provides discrimination of the information contained in the signal to authenticate the tested article, and provides various outputs to be described below. The purposes of these elements and the relationships among them will become clear by reference to the drawings in conjunction with the following, more detailed description, in which the same reference numerals refer to the same or similar elements. In the following description, the basic authentication system, such as that of U.S. Pat. No. 5,418,855, is described first, followed by descriptions of preferred embodiments incorporating the novel features of the present invention.

FIG. 1 is a schematic diagram showing the overall functional structure of the authentication system. An ultraviolet light source 10 provides ultraviolet light 20 to illuminate the article 30 to be recognized and authenticated. Article 30 is not part of the invention. If the source's light output contains significant amounts of visible light, an ultraviolet optical filter 40 may be used to block the visible light and to allow the ultraviolet light to pass. The ultraviolet light is directed by a beam splitter 50 toward the article, preferably through a lens 60, which focuses the ultraviolet light upon the article. In this embodiment, beam splitter 50 is a conventional beam splitter. Novel means for performing such a function in a preferred embodiment of an authentication system are described hereinbelow. The lens 60 must transmit both ultraviolet light and the fluorescent secondary light 70 returned from the article. A mirror may be used in place of lens 60. The fluorescent secondary light 70, which is often in the visible part of the optical spectrum, is directed by beam splitter 50 toward a dispersion element or filter set 150 to distinguish selected wavelengths allowed to reach photodetector 160. In this embodiment, element 150 is a simple passband optical filter. The photodetector output is conditioned by electronic signal processing circuits 80, described in more detail below, to produce a signal suitable for analysis by a microcomputer 85. The microcomputer 85 analyzes the signal to produce various authentication result outputs 90, also described in detail below. For applications which require scanning, such as bar code reading, the authentication system also includes scanning means 100. The scanning means 100 may comprise one or more oscillating mirrors or other scanning means known in the art to provide repetitive deflection of an ultraviolet light beam. For some applications, such as the authentication of articles in a production line, the scanning means are not needed in the authentication system, as the articles may be passed before lens 60 automatically, for example, by a conveyor belt.

For some applications, such as authentication of a credit card, it is desirable to have other inputs to the microcomputer, such as a magnetic stripe reader. The information encoded in the magnetic stripe is then used in combination with the fluorescent marking to add yet another dimension to the authentication process. Such combinations of more than one means of authentication can provide better overall security for articles of high value.

Figure 2:
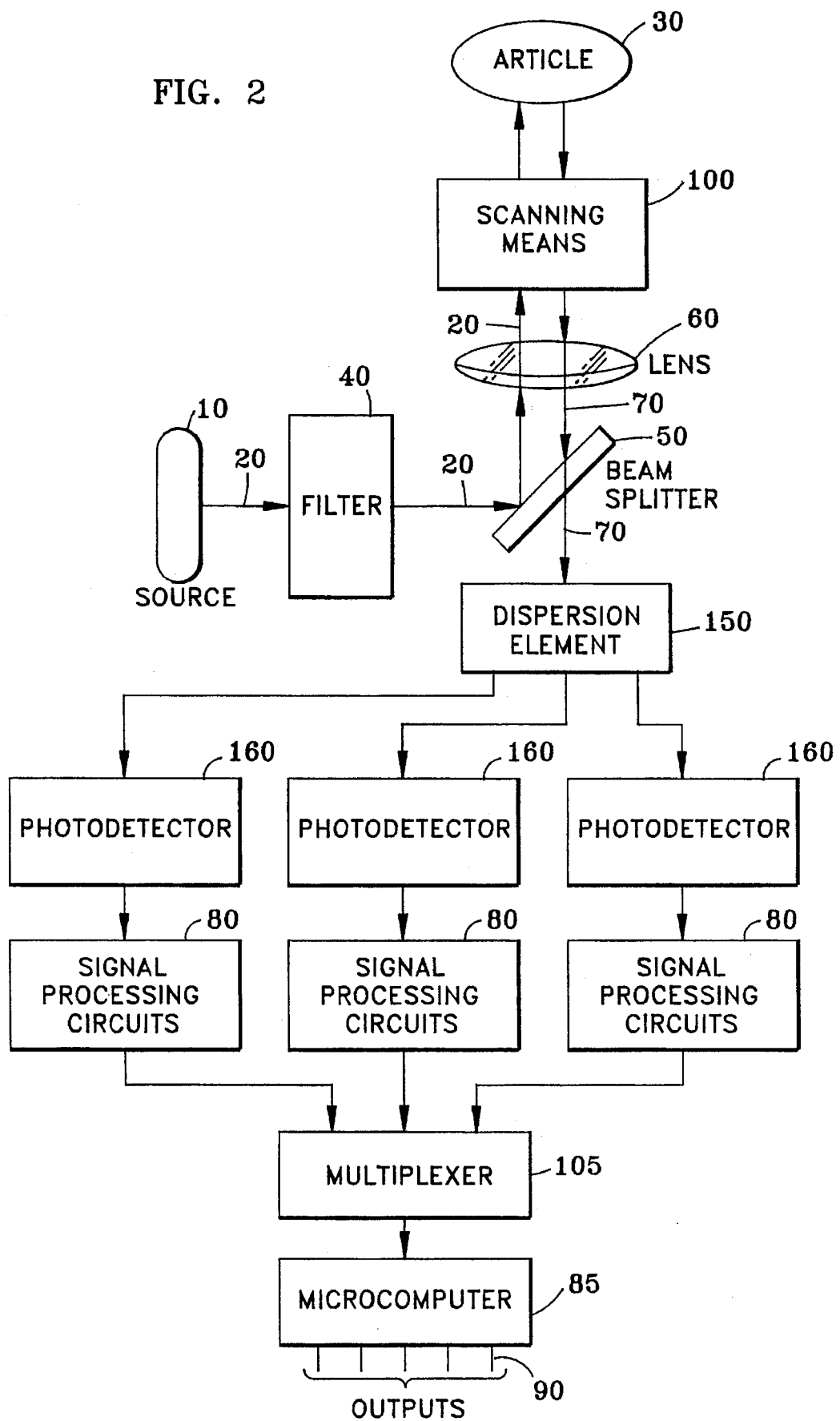
FIG. 2 shows an overall schematic diagram of another embodiment of the authentication system, having a multiplicity of parallel information channels.

In an authentication system for authenticating articles of high value, portions of FIG. 1 may be replicated to provide a number of additional parallel channels of information. For example, FIG. 2 illustrates a system with three information channels, where the respective analog outputs of the three channels are multiplexed by multiplexer 105. Each channel carries information about a narrow band of fluorescent light from the same articles For a system as shown in FIG. 2, the wavelength-selective element 150 is a set of bandpass filters or a dispersive element such as a prism or diffraction grating.

Figure 3:
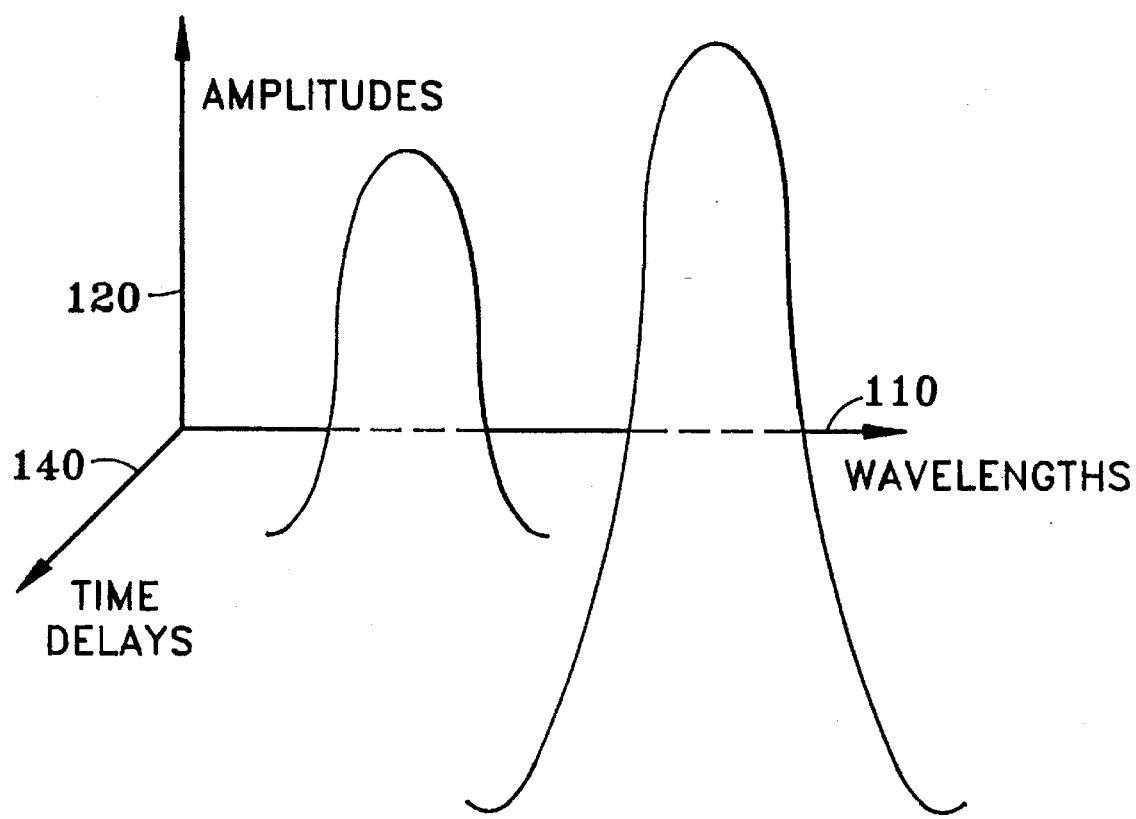
FIG. 3 illustrates a multi-dimensional discrimination space utilized in some embodiments of the invention.

An important feature of the authentication system is that it uses multiple dimensions of discriminating characteristics to authenticate the markings on articles. FIG. 3 shows an illustration of a three-dimensional discrimination space used in the logical operation of the authentication system. Because it is impractical to illustrate discrimination spaces of four or more dimensions by means of a drawing, FIG. 3 shows only a simplified scheme in which some of the discrimination dimensions have been omitted for clarity. The three dimensions shown in FIG. 3 are (a) the wavelengths 110 emitted by one or more fluorescent materials with which the articles have been marked, (b) the amplitudes of fluorescent response 120 expected from the marks, and (c) the time delay 140 of fluorescent emission expected from the marks. In experiments with apparatus as described here, wavelength differences of less than 50 nanometers and time delays of less than 20 nanoseconds were distinguished. The use of bar codes printed with fluorescent substances, for example, adds a spatial dimension to coding of article marking. The spatial dimension is not limited to bar codes, but may be implemented by using any predetermined pattern distinguished by the localized presence or absence of marks of one or more of the detectable wavelengths of fluorescent emission, or by a predetermined sequence of mark sizes. Such a sequence may be arranged along a particular spatial dimension or arranged in a pattern in more than one spatial dimension. Another manner of using spatial coding uses two or more bar codes printed in the same location on an article and detected by the authentication system as, for example, an invisible bar code printed over a visible bar code.

A predetermined combination of criteria to be used in authenticating articles may be considered an encryption of the articles' identity. Since that encryption is unknown to potential counterfeiters of the articles and may be changed by the system user, the encryption provides a high degree of security against counterfeiting.

Figure 4:
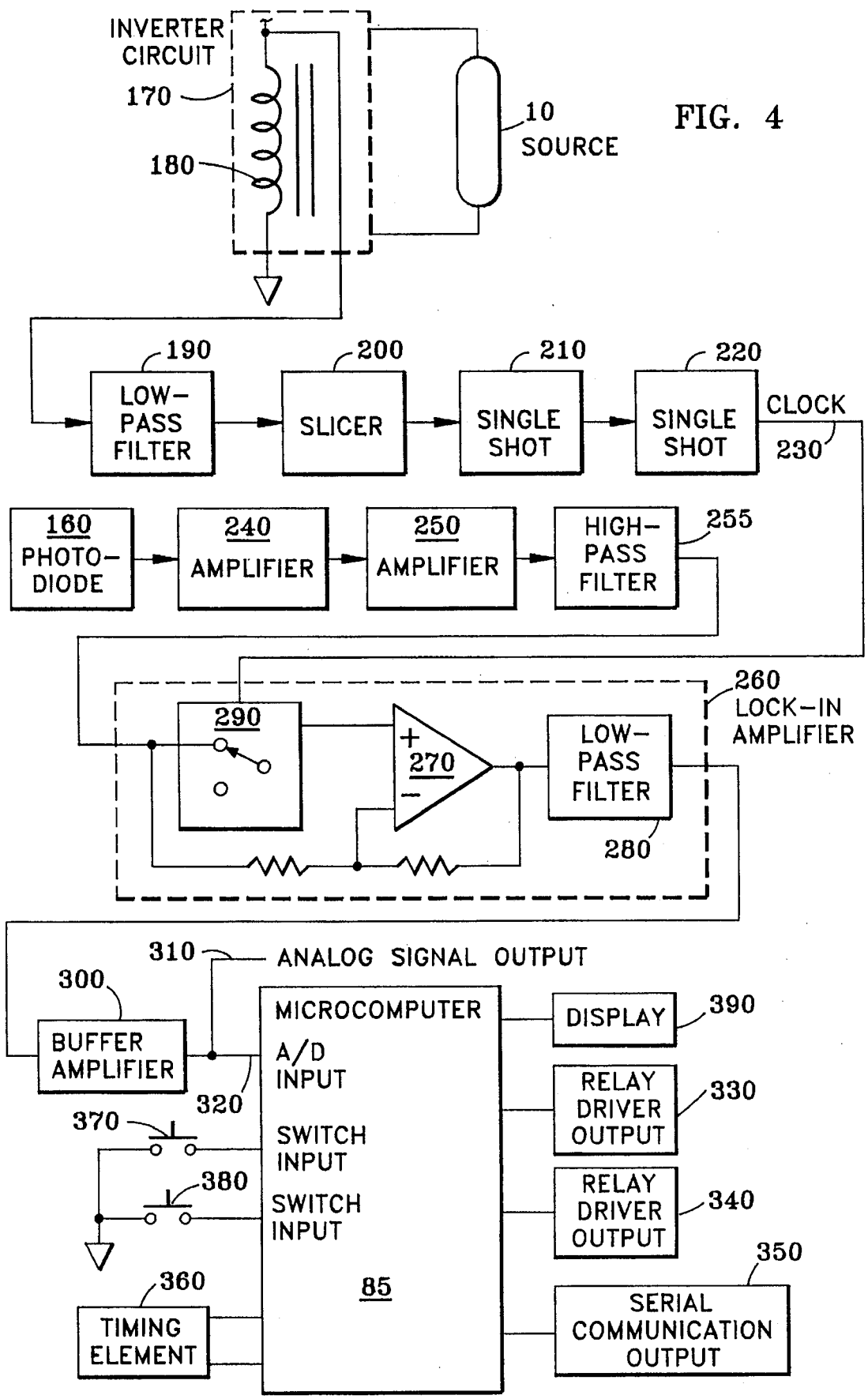
FIG. 4 shows a schematic diagram of a circuit used in one embodiment.

FIG. 4 shows a schematic diagram of a circuit used in the authentication system to perform the functions of energizing and modulating the ultraviolet lamp 10 at a high frequency, amplifying and synchronously demodulating the weak resulting fluorescent radiation signal from the photodiode 160, and producing an analog output. In one embodiment, the ultraviolet lamp 10 is an ultraviolet cold-cathode fluorescent lamp. It will be understood that the light source 10 of the invention may be any suitable light source. For some applications of the authentication system for example, the preferred light source 10 is a pulsed laser, and suitable modifications are made to the circuit to energize the laser and control its pulse frequency.

In the embodiment illustrated in FIG. 4, a resonant push-pull inverter circuit 170 (acting as a lamp driver) converts 12 volt DC power to sinusoidal AC at a high frequency of more than about 25 kHz, preferably more than 50 kHz. The frequency is determined by the resonant frequency of an LC circuit made up of a transformer and capacitors in the inverter circuit 170 (not shown). Such inverter circuits are known in the art. In a preferred embodiment, it is desirable to limit the AC current supplied to the lamp 10. The high frequency output of inverter 170 is applied to the ultraviolet lamp 10 to energize it and to modulate its light output at twice the inverter frequency, i.e. more than about 50 kHz, preferably more than 100 kHz. A separate output is tapped from an inductor 180 of the inverter, and the pulses of current at the doubled frequency on this output are filtered and shaped to produce a clock signal for a lock-in amplifier. The inductor 180 may be part of a transformer of the inverter circuit. The current pulses are first filtered with a low-pass filter 190 to produce a substantially sinusoidal wave form, then shaped by slicer circuit 200, such as National Semiconductor voltage comparator circuit LM311, to produce a substantially square wave form. The square-wave signal is adjusted in phase by a first single-shot circuit 210, and is adjusted to approximately 50% duty cycle by a second single-shot circuit 220 to produce the desired clock signal 230. In practical application of the embodiment illustrated, single-shot circuits 210 and 220 are adjusted to optimize the sensitivity of the authentication system to the authentic articles or their equivalents used as calibration targets.

The fluorescent light returning from an article to be recognized is detected by a photodiode 160, such as a PIN type of photodiode. The photodiode signal is amplified by two low-noise, wide-bandwidth, high-gain amplifiers 240 and 250, such as Linear Technology LT1028 series ultra-low-noise operational amplifiers. In a preferred embodiment, the total gain of amplifiers 240 and 250 should be about 25,000 or higher. A high-pass filter 255 blocks low frequencies. The amplified and filtered optical signal is synchronously detected by the lock-in amplifier 260. The phase-adjustment single-shot 210 previously mentioned is used to adjust the lock-in clock signal 230 with respect to the phase of the optical signal amplified from the photodiode.

The lock-in amplifier 260 comprises an amplifier 270 whose gain is switched between +1 and −1, followed by a low-pass filter 280. The switching of amplifier 270 gain is done by an field-effect transistor (FET) switch 290 driven by the clock signal 230. The low-pass filtered signal goes to a buffer amplifier 300, which produces the buffered analog signal output both to an output connector 310 and to an analog-to-digital (A/D) input 320 of microcomputer 85. The timing of microcomputer 85 operation is determined by a timing element 360, such as a ceramic resonator. Timing element 360 may alternatively be a suitable external clock input.

Microcomputer 85 may be, for example, a Motorola MC68HC705P9 or equivalent, or any one of a number of microcomputers classified as digital signal processors. In an alternate embodiment of the authentication system, the microcomputer 85 may be timed by a clock generator, and the frequency of lamp driver 170 may be derived from the microcomputer clock signal, as for example by frequency division.

The analog signal at input 320, produced by the circuit of FIG. 4, is converted within digital microcomputer 85 to a digital signal and used by the microcomputer according to its stored program to produce various digital outputs, including outputs to drive a display for displaying information to the operator of the authentication system and other outputs to control sorters or other optional apparatus. In a preferred embodiment, the microcomputer program compares the digital signal with standard digital signals previously stored in a memory portion of the microcomputer. In other embodiments, the microcomputer program and/or the standard digital signal information may be stored in external storage means, such as ROM's EPROM's, memory cards, IC cards, or the like, connected to microcomputer 85 by other connections not shown.

A number of authentication result outputs are provided by the authentication system for various purposes of users. The simplest output is the analog output of buffer amplifier 300 provided at analog output connector 310. The same signal is applied to A/D input 320 of the microcomputer 85, which processes the signal in a number of ways to produce other outputs. Some additional outputs provided from microcomputer 85 are relay driver outputs 330 and 340 at various voltages, a light-emitting diode (LED) array display 390, and an RS-232 standard serial communication output 350, which also serves as an input port to microcomputer 85. Microcomputer 85 has other inputs, including switch closure inputs 370 and 380 for use by the system operator. Microcomputer 85 may have still other inputs, such as digital inputs from a magnetic stripe reader used in conjunction with the fluorescent marking for further information to be used in determining authenticity of articles.

Figure 5:
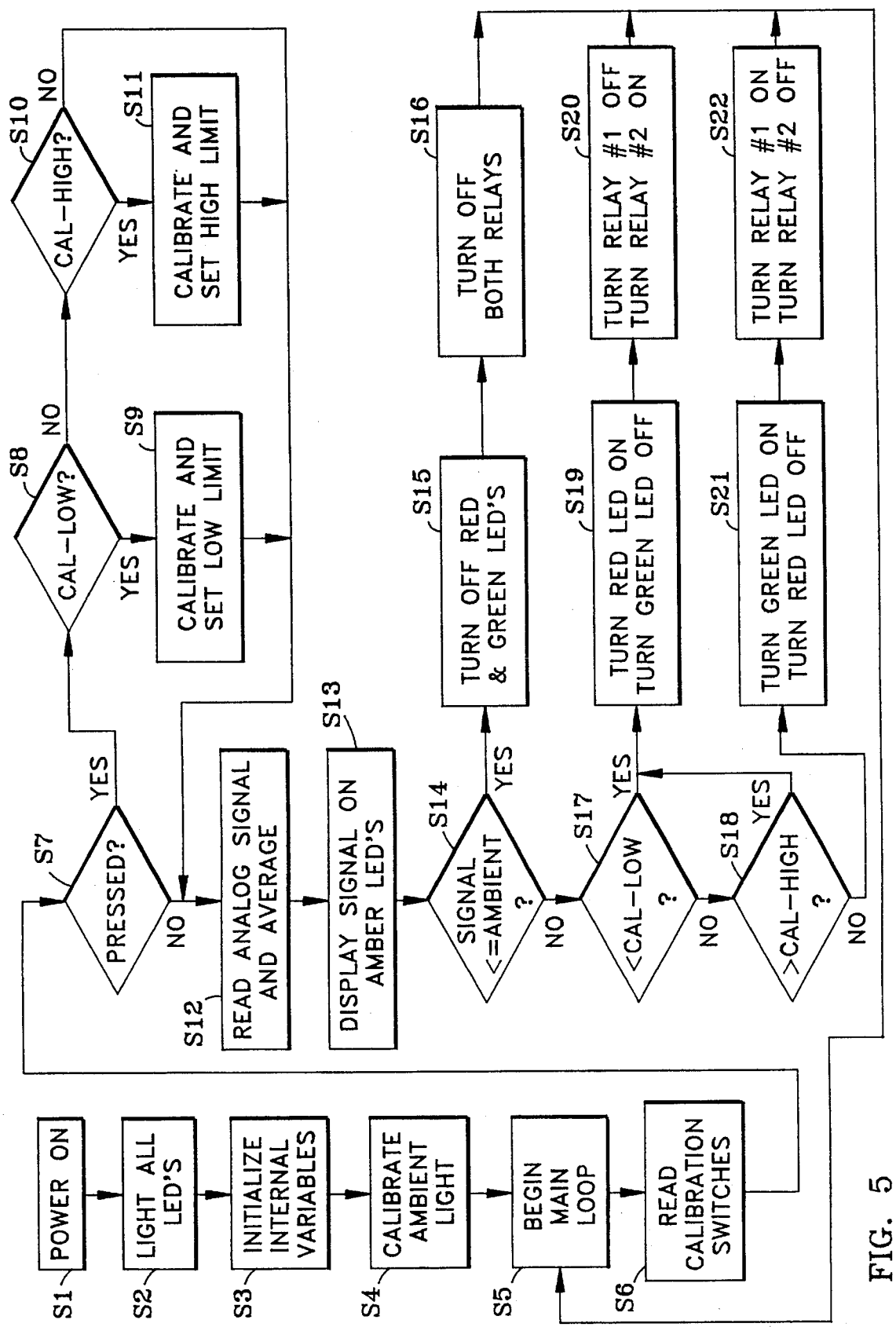
FIG. 5 shows a schematic flow diagram of a method used in an embodiment to detect the predetermined article marking.

FIG. 5 is a flow chart illustrating a program used in one embodiment of the invention. In FIG. 5, rectangular boxes represent actions and diamond-shaped boxes represent decisions. When the power is turned on (S1), the microcomputer program of the authentication system lights all LED indicators (S2), initializes all internal variables (S3), and calibrates the ambient fluorescent light (S4). The program then begins the main program loop (S5). It reads the calibration switches (S6). If one of them is pressed (S7), the program determines if it is the CAL-LOW switch (S8). If it is the CAL-LOW switch, the program calibrates and sets the low light limit (S9) and returns. If it is not, the program similarly determines if it is the CAL-HIGH switch (S10). If it is the CAL-HIGH switch, the program calibrates and sets the high light limit (S11) and returns. In an alternative embodiment not shown in FIG. 5, factory calibration results may be stored in a read-only-memory associated with the microcomputer, and the factory calibrations are then used in later steps of the program, unless the user over-rides the factory calibration. If no calibration switch is pressed, the program reads the analog signal a predetermined number of times and averages the results (S12). (In other embodiments not shown in FIG. 5, step (S12) may be triggered by external command, and the function of step S12 may include other treatments of the signal, other than averaging.) In the sequence shown in FIG. 5, the program displays the result in an array of amber LED's (S13). It compares the average result with the ambient light calibration (S14). If the result is less than or equal to the ambient, the program turns off both a red LED and a green LED (S15) and turns off both a first and a second relay (S16). The program then compares the average result with the low limit (S17), and compares the average result with the high limit (S18). If the result is less than the low limit or greater than the high limit, the program lights the red LED and turns off the green LED (S19), and also turns off a first relay and turns on a second relay (S20), and returns to restart the main loop (S5). If the result is not less than the low limit and not greater than the high limit, the program turns the green LED on and the red LED off (S21), and also turns on the first relay and turns off the second relay (S22), and returns to the main loop (S5). In this simple and inexpensive embodiment, the user can determine the authentication result by observing the LED's.

It will be understood that a similar program flow may be used for each of the several discrimination criteria or dimensions employed for discriminating articles by the methods and apparatus of the present authentication system. It will be appreciated from the foregoing descriptions of the invention that many combinations of discrimination criteria may be programmed into the authentication system described, besides those criteria that are explicitly mentioned herein.

Security documents, such as bank checks, credit cards, driver's licenses, identification cards, passports, currency, legal documents such as wills and contracts, may be made to take advantage of the methods of authentication described here. The methods using multiple discrimination criteria can be applied if the security document has two or more fields, at least one of which bears indicia made with a fluorescent substance.

The authentication system is easy to use. The user directs the authentication system's optical front-end portion so that it illuminates the articles to be authenticated or moves such articles past the system's optical front end at a suitable speed and suitable distance, taking into account the focal length and depth of focus of the system's lens. The various authentication result outputs described above indicate whether or not an authentic article has been detected. If an authentication result output has been arranged to sort articles, then the articles are automatically sorted. If optional means to confiscate, destroy, or mark the unauthenticated articles have been included in the authentication system, those actions provided are carried out automatically unless additional means are included to require human confirmation of such actions.

Another way to use the authentication system is to incorporate the predetermined fluorescent substance, such as dye or ink (at a predetermined concentration) into other material that is to be recognized and measured on articles during their manufacture, for quality control. The articles are passed before the authentication system to perform a quality control inspection. The authentication outputs are then recorded by the system microcomputer and analyzed statistically to provide statistical process control or quality control information about the articles. In particular, the microcomputer can be programmed to calculate statistical process control limits and to test each article for conformance to those process control limits. This kind of application of the authentication system is especially useful for monitoring expensive materials. In experiments on controlling a process of applying a non-fluorescent substance to a fluorescent paper, another fluorescent substance was added to the applied non-fluorescent substance at a level of only 0.02% and then was measured by the apparatus of this invention in the presence of the fluorescent background from the paper.

In a particularly simple manner of using the invention in one of its preferred embodiments, the operator first turns on the authentication system power with no target article present within the view of the system. The system is programmed to read the ambient fluorescent light signal level automatically. The system may be calibrated by presenting sample targets known to produce low-limit and high-limit fluorescent light signals, while pressing the LOW and HIGH calibration limit switches respectively. Thereafter, the system automatically and repeatedly samples the fluorescent light from articles, indicating the result through an array of amber LED's, a red LED, a green LED, and two relays. The array of amber LED's is programmed to show the signal level on a linear or logarithmic scale. If the signal is in the range between the LOW and HIGH limits, a green LED is turned ON, a red LED is turned OFF, and one relay is set to indicate a positive authentication. If the reading is between the ambient level and the LOW limit or is above the HIGH limit, then a red LED is turned ON, the green LED is turned OFF, and another relay is set to indicate negative authentication. If the reading is at or below the ambient level, both LED's and both relays are set to OFF, indicating that no authentication result is available.

BEST MODES FOR CARRYING OUT THE INVENTION

Turning now to the detailed description of the improved system of the present invention, including its preferred embodiments and the best mode of carrying out the invention, this description is illustrated by FIGS. 6–16, in which the same reference numerals are used to denote the same or similar elements.

While the overall apparatus and methods described hereinabove and previously disclosed in U.S. Pat. No. 5,418,855 is very useful, the present invention extends the utility of fluorescent authentication methods and apparatus to economically achieve new levels of security and of performance and consistency in authentication of articles. Cost of manufacture is reduced by simplification of the optical portion of the apparatus, including elimination of a conventional beam splitter. Improved security of authentication is achieved by combining a multiplicity of readers, including at least one fluorescence authentication reader using a multiplicity of discriminating variables to characterize the fluorescent light from articles being authenticated. The additional readers make counterfeiting of articles even more reliably detectable by adding additional criteria to be taken into account by the program of the authentication system's computer (besides the various multiple technical characteristic variables of the fluorescent light response 70). The improved technical performance in fluorescent light discrimination is provided in part by novel optics, in part by improved electronic circuitry having improved frequency stability and improved control of stimulus illumination, and in part by improved methods of computer characterization of the secondary fluorescent light, all of which cooperate in the most preferred embodiment of the invention to produce extremely reliable and consistent authentication. Each of the technical elements of the invention is described hereinbelow in turn.

Figure 6:
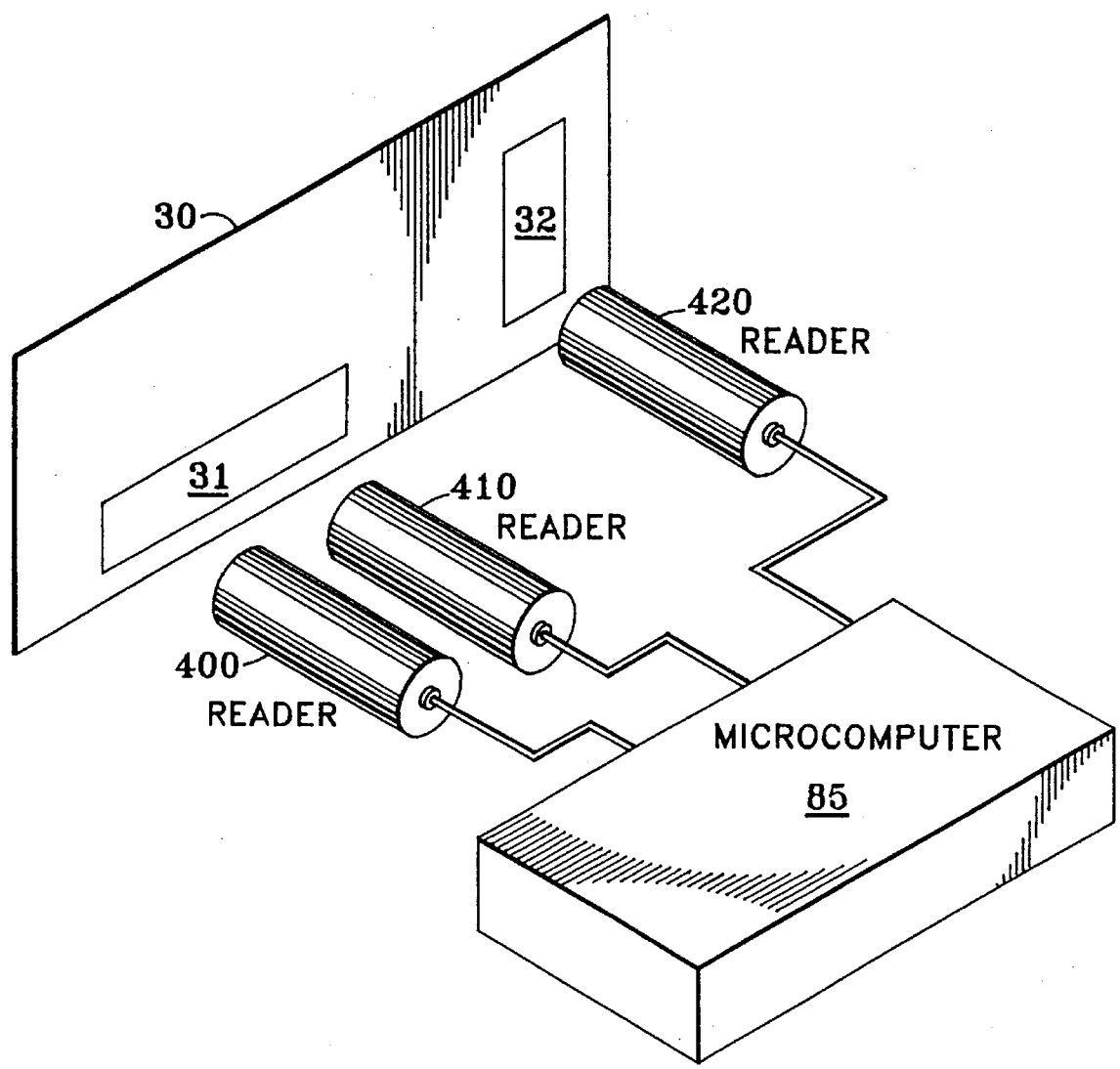
FIG. 6 shows a schematic diagram of an embodiment using a multiplicity of readers, made in accordance with the invention.

FIG. 6 illustrates an embodiment of the invention which uses a multiplicity of readers to authenticate articles. Besides a reader of fluorescent indicia, the readers can include readers of magnetic indicia, holographic indicia, visible characters, or visible bar codes, for example. Indicia of various kinds can be provided on articles known to be authentic. For example, a single article, such as a credit card, could carry ordinary visible bar codes, bar codes printed in fluorescent inks, and codes recorded in a magnetic stripe. In FIG. 6, article 30 has two kinds of indicia in a pre-defined field 31 and one kind of indicia in another pre-defined field 32. A reader 400 and a different reader 410 can both scan field 31 and read the two different kinds of indicia in that field, while a third reader 420 can scan field 32 and read the indicia in that field. For example, reader 400 may incorporate the apparatus described above for reading bar codes printed with fluorescent substances, and reader 410 can be a similar reader adapted for visible-ink bar codes, while reader 420 may be a magnetic stripe reader. The results of the three readers in this example are combined by microcomputer 85 to determine if the article is authentic. Optionally, a multiplexer (not shown) can be interposed between the multiplicity of readers and the microcomputer. It will be apparent that the number of different indicia may be two, or may be more than the three illustrated in FIG. 6. The security of the authentication scheme is enhanced by using multiple codes. The multiple codes can be combined in various ways unknown to a potential counterfeiter or unauthorized user of the article in question. For example, one of the kinds of indicia may carry a key code which is used to allow access to information stored in a removable form of memory used with the authentication system. The access permission would operate similarly to the use of a password in allowing access to an information-processing system or to a particular account on such a system. It will be apparent to those skilled in the art that the term reader as used in this specification may be understood to include detectors of various physical phenomena that may be used to make indicia, and that such detectors may provide separate inputs to the same microcomputer that characterizes the secondary fluorescent light response of coded articles. Also, commercially available conventional readers having built-in computing apparatus or other feature-discriminating apparatus may be used, with their final output becoming an input to computer 85 of the present invention. The second, third, . . . etc. readers of FIG. 6 may be additional fluorescence authentication readers or may be selected from among the other types of readers mentioned hereinabove. To summarize this aspect of the invention: the authentication system includes at least a reader adapted to read indicia printed with a substance that fluoresces when illuminated with ultraviolet light, any number of readers adapted to read other indicia, and a computer programmed to receive the outputs from the readers, to decode the indicia, and to produce an authentication result depending on whether or not the indicia agree with predetermined indicia codes.

In another aspect of the invention, the improved authentication system combines improved and simplified optics with improved electronics in a system that includes provision for gating and/or synchronizing the fluorescence authentication reader with the other readers of FIG. 6 (which optionally may also be fluorescence authentication readers).

Figure 7:
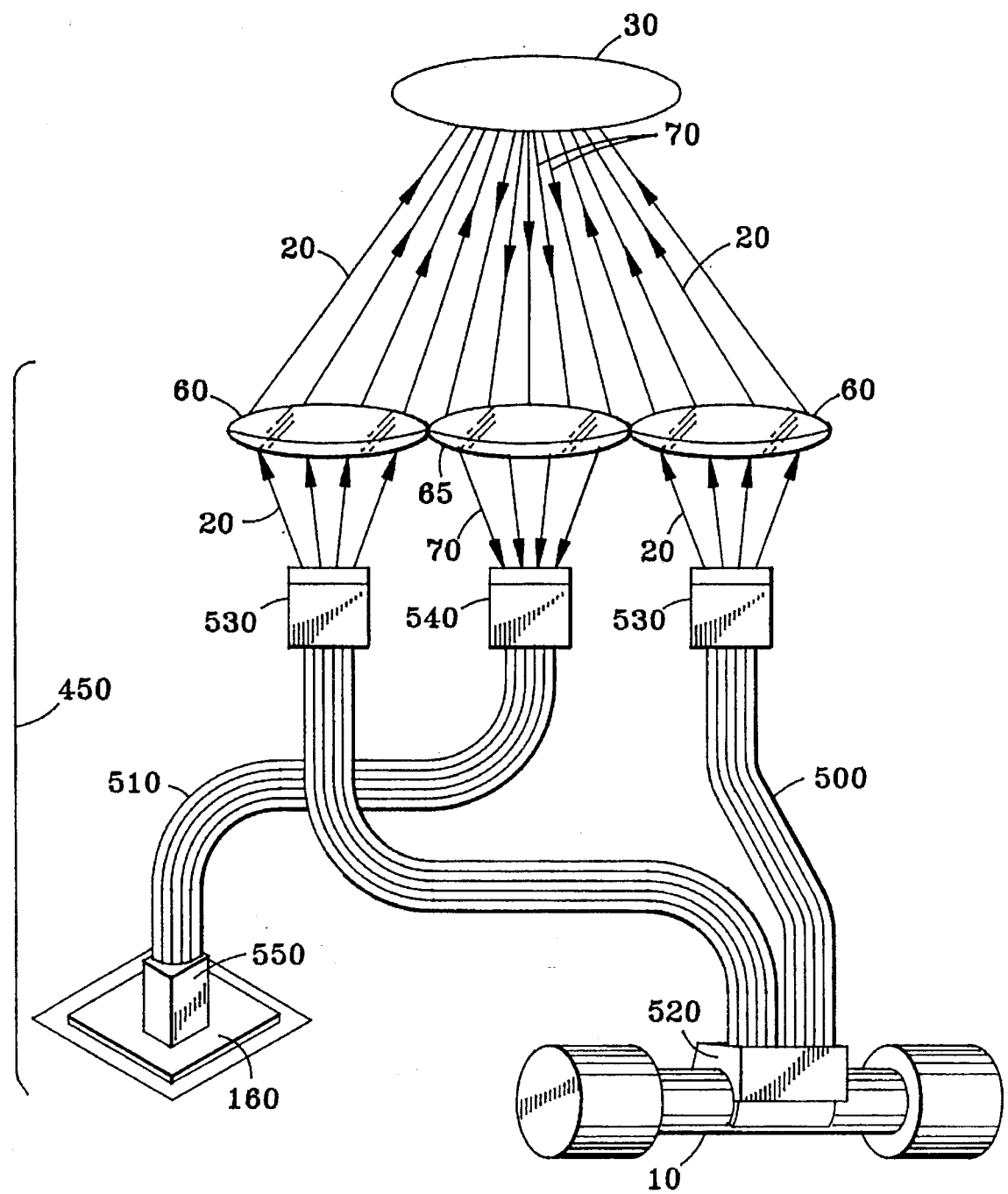
FIG. 7 shows a schematic diagram of an optical subsystem of a preferred embodiment.

FIG. 7 shows a portion of an optical subsystem of a preferred embodiment, which eliminates the conventional beam splitter 50 mentioned hereinabove, while still performing the functions of directing ultraviolet light 20 toward the article 30 to be authenticated and directing the fluorescent secondary light 70 to photodetector 160. Light guides 500 carry ultraviolet light 20 from lamp 10 to the vicinity of lenses 60. Other light guides 510 carry secondary fluorescent light 70 from article 30 that is collected by other lenses 65 to photodetector 160. Light guides 500 and 510 may be bundles of suitable fiber optic fibers, but need not be identical. Light guides 500 must be substantially transparent to ultraviolet light 20, while light guides 510 must be substantially transparent to the fluorescent secondary light 70 to be detected for authentication. In the first preferred embodiment utilizing the optical subsystem of FIG. 7, a conventional beam splitter 50 is eliminated and this subsystem performs a similar function. Suitable light-guide couplings 520, 530, 540, and 550 may be used at the ends of light guides 500 and 510, as in conventional light guide practice. Ultraviolet source lamp 10 may have a reflective coating interrupted at the location of interface coupling 520 of light guide 500.

Another important difference of this first preferred embodiment from the embodiment illustrated schematically in FIG. 1 is that in the embodiment of FIG. 7 the elements related to ultraviolet light output 20 (viz. lenses 60 and light guides 500) are arranged coaxially around the elements related to secondary fluorescent light 70 (viz. lenses 65 and light guides 510). The substantially common axis of the two coaxial portions passes through article 30, as illustrated schematically in FIG. 7. Although FIG. 7 shows the ultraviolet-light-related portion as the peripheral or surrounding member of the coaxial relationship, and shows the secondary-fluorescent-light portion as the central member, these may be reversed for some designs without departing from the coaxial relationship. In other words the ultraviolet-light-related lens and light guide may be the central portion, and the secondary-fluorescent-light-related lenses and light guides may be the peripheral or surrounding portion. For some applications, light guides 500 may be liquid-filled light guides, such as those of U.S. Pat. Nos. 5,165,773, or 5,412,750, or 5,452,395, for example. If liquid-filled light guides are used, light guide couplings 520 and 530 may be similar to those of U.S. Pat. No. 5,384,871, for example.

Figure 8:
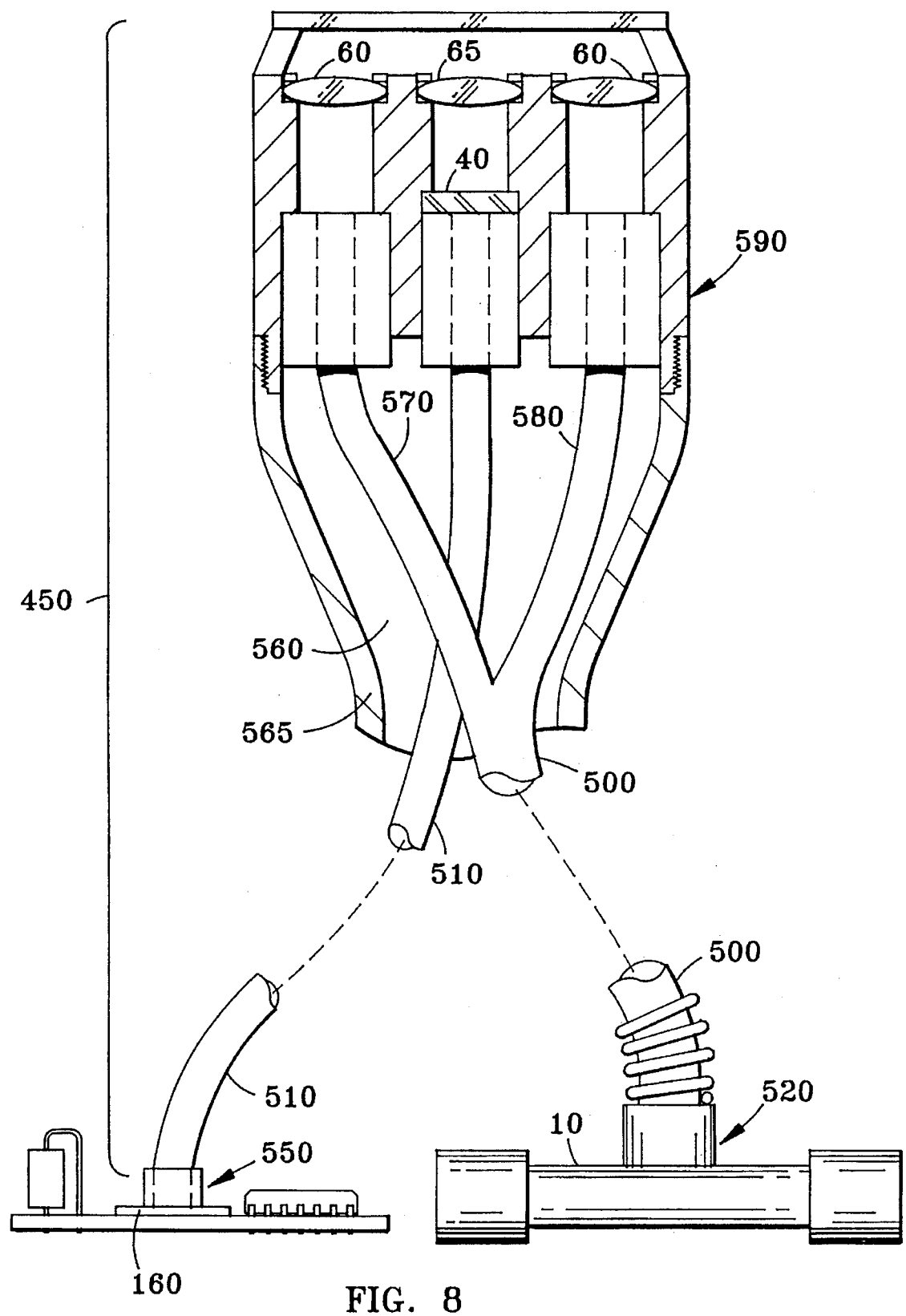
FIG. 8 shows a schematic diagram of another optical subsystem of a preferred embodiment.
Figure 9:
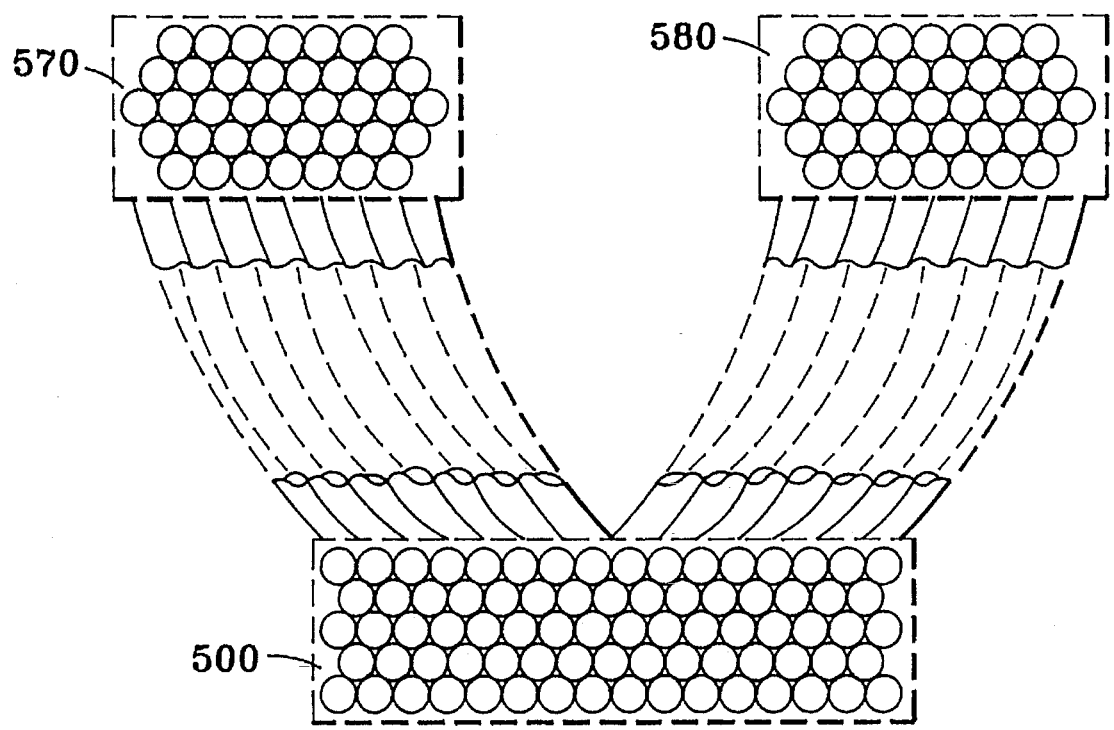
FIG. 9 shows a detail of an optical subsystem of a preferred embodiment.

FIG. 8 shows a second preferred embodiment similar to FIG. 7, but adapted to form a mechanically flexible optical cable assembly 560. Cable assembly 560 includes a sheath 565, which surrounds both light guides 500 and 510. Light guide 500 may be bifurcated into light guide portions 570 and 580, which are optically coupled to lenses 60. Light guide 510 is optically coupled to lens 65, which acts as the detecting lens, collecting secondary fluorescent light from the article to be authenticated. In the optical path of light guide 510 is a bandpass filter 40, discussed further hereinbelow. A wand housing 590 encloses those optical components at the end of cable assembly 560 nearest the articles being authenticated. The wand-like assembly of FIG. 8 allows flexible positioning of these optical components with respect to the rest of the authentication system and the articles to be authenticated. FIG. 9 illustrates a particular arrangement of individual optical fibers implementing a bifurcation of an optical fiber bundle forming light guide 500 into two branches comprising optical fiber bundles forming light guide portions 570 and 580.

It will be apparent that the arrangements of FIGS. 7 and 8 and other coaxial arrangements may be coaxial in either a two-dimensional sense or in a full three-dimensional sense. In the two-dimensional sense, the principal optical components are all disposed within an imaginary plane passing through the central element, e.g. two illuminating light guides 500, one on either side of a single central detecting light guide 510. In the three-dimensional sense, a number of outer optical elements, such as illuminating light guides 500 and their associated lenses 60 are disposed in a substantially symmetric arrangement spaced around a circular cylinder centered on the central or axial optical element, such as detecting light guide 510 and its associated lens 65.

Figure 10:
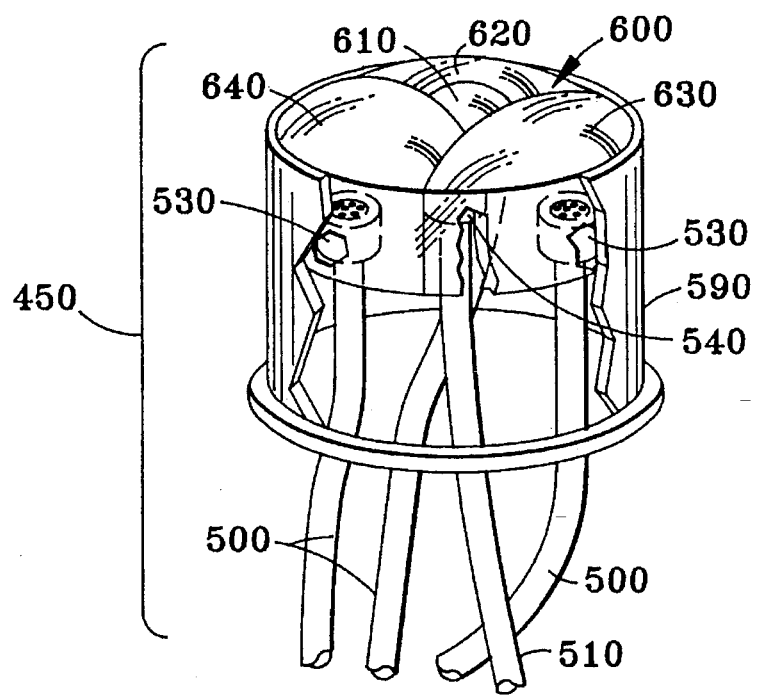
FIG. 10 shows a cutaway perspective view of an optical subsystem of a preferred embodiment.
Figure 11:
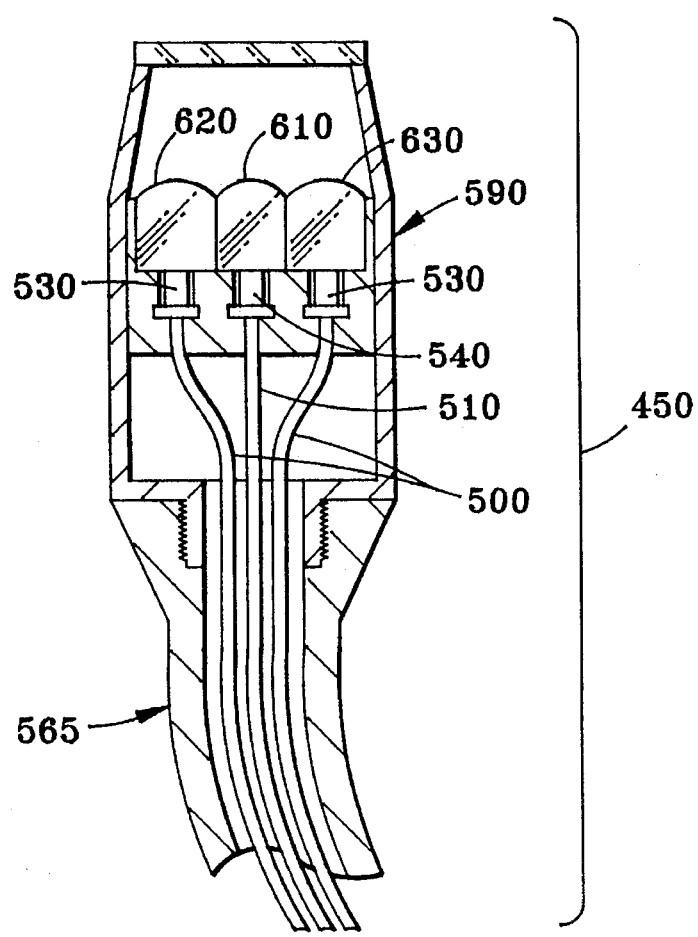
FIG. 11 shows a cross-sectional side elevation view of an optical subsystem of a preferred embodiment.

A third preferred embodiment incorporating a coaxial optical subassembly is illustrated in FIGS. 10 and 11. FIG. 10 is a partially cutaway, perspective view of a three-dimensionally coaxial optical subassembly. FIG. 11 is a cross-sectional view of a similar three-dimensionally coaxial optical subassembly made in the form of a wand similar to that shown in FIG. 8. FIGS. 10 and 11 include a coaxial compound lens 600, integrally incorporating an axial or central lens portion 610 and a number of peripheral or surrounding lens portions 620, 630, and 640. While FIG. 10 shows three peripheral lens portions, and FIG. 11 as a planar cross-sectional view can only show two peripheral lens portions, there may be any number of such peripheral lens portions. In particular, the peripheral portion of a coaxial compound lens 600 may be a single annular lens portion, as described hereinbelow. The coaxial compound lens 600 of FIG. 10 may be made, for example, by molding a suitable transparent material in a mold incorporating the shapes of the central lens portion and the peripheral lens portions. By making the axial and peripheral portions of different materials, it is possible to optimize each of the two coaxial portions for that portion of the spectrum which it is intended to pass, respectively.

Figure 12:
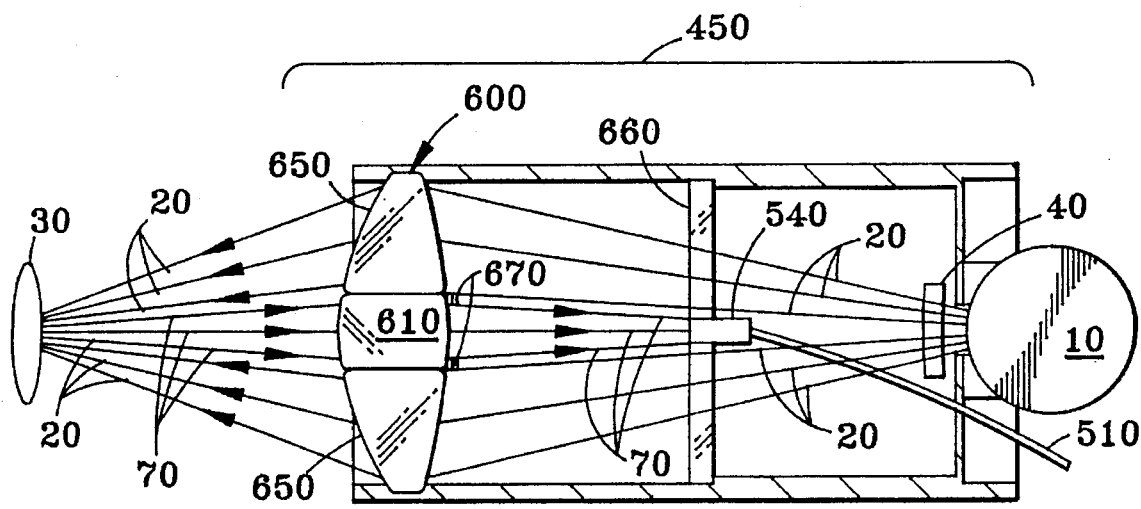
FIG. 12 shows a cross-sectional side elevation view of an optical subsystem of another preferred embodiment.

FIG. 12 shows a cross-sectional view of a coaxial optical subassembly 450 having a coaxial compound lens 600 comprising a central or axial lens portion 610 and an annular peripheral lens portion 650. Axial lens portion 610 performs the same function as detector lens 65 of FIGS. 7 and 8. Annular peripheral lens portion 650 performs the same function as illuminating lenses 60 of FIGS. 7 and 8. Aperture stops 670, if needed, may be disposed behind coaxial compound lens 600 or may be thin opaque films deposited and patterned on its rear surface. Light guide 510 carries detected secondary fluorescent light to photodetector 160 (not shown in FIG. 12). The input end of light guide 510 is disposed on the axis of coaxial compound lens 600, held in place by an ultraviolet-transparent window 660 or alternatively by one or more thin radial supports for example. An optical filter 40 may be used to block visible light if needed. Coaxial optical subsystems such as those shown in FIGS. 7–11, besides saving the cost of expensive beam splitters, can also be more efficient by having less absorption.

Figure 13B:
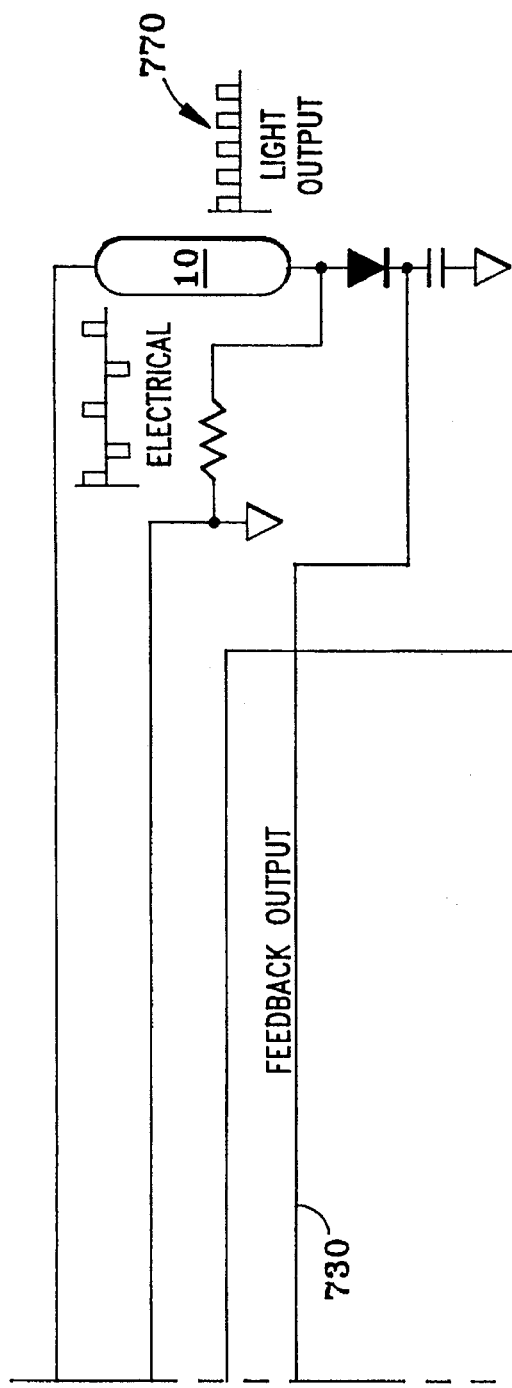
FIG. 13 shows an overall electrical schematic diagram of a preferred embodiment.
Figure 13B:
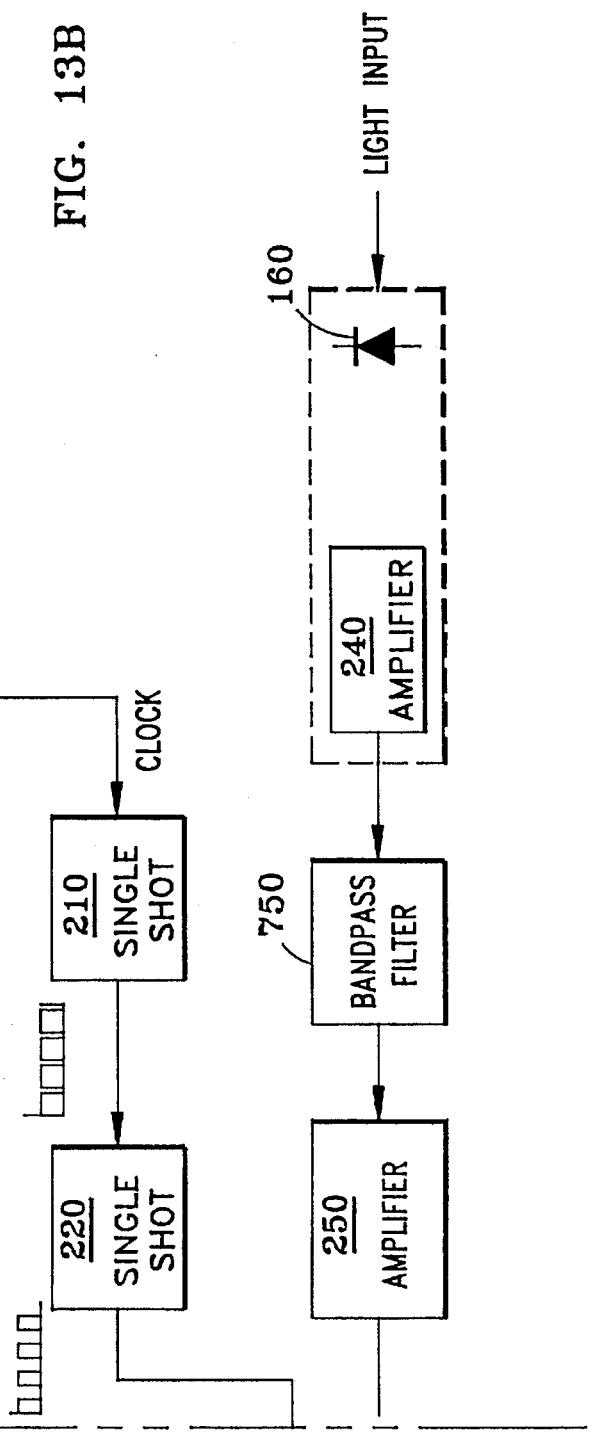

Another portion of the authentication system that is improved by the present invention and made more readily adapted in multiple-reader systems is the electronics portion. The resonant mode inverter depicted in FIG. 4 works well in an authentication system, but can be subject to some frequency drift, can be subject to some variation with temperature, can allow the source ultraviolet light output to be subject to variations (for example as the lamp ages), and is not readily adaptable to light output control. FIG. 13 shows a schematic diagram of improved electronic circuitry used in a preferred embodiment of apparatus made in accordance with the invention. In its overall architecture, the circuit of FIG. 13 is similar to that of FIG. 4, but the circuit of FIG. 13 has a crystal-controlled oscillator 710 operated at a frequency of more than about 25 kHz, a photodetector 720 detecting the ultraviolet electromagnetic radiation from source 10, a feedback output 730 from photodetector 720, and an inverter 740 energizing the source 10. Crystal-controlled oscillator 710 and inverter 740 are major components of a driver circuit for source 10, shown in more detail in FIG. 15. The inverter 740 is controlled both by crystal-controlled oscillator 710 and by feedback output 730 of photodetector 720. Photodetector 720 is preferably a photodiode, as shown in FIG. 13. It has been found that a crystal-controlled-oscillator frequency of more than about 25 kHz (preferably about 33 kHz) provides sufficiently fast authentication along with stable and repeatable triggering of the authentication apparatus. The frequency of the crystal-controlled oscillator 710 of FIG. 13 is 32.768 kHz, which provides excellent performance, especially when combined with the other novel aspects of this invention.

Figure 14B:
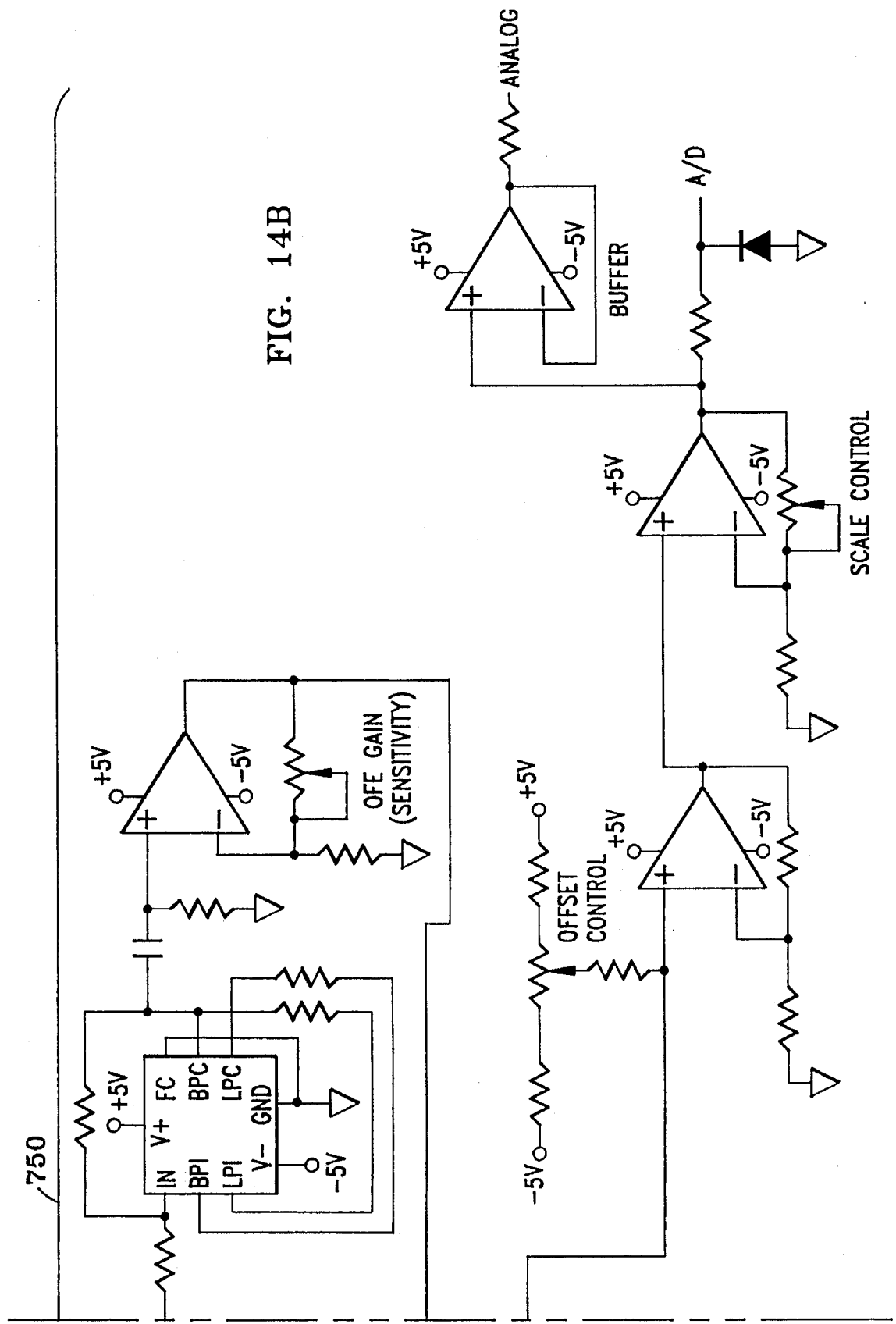
FIG. 14 shows an electrical schematic diagram of a portion of a preferred embodiment.

The crystal-controlled oscillator 710 clocks both inverter 740 and lock-in amplifier 260. The precise frequency control provided by crystal-controlled oscillator 710 allows use of a very narrow electrical bandpass filter 750, which replaces high-pass filter 255 of FIG. 4 at the preamplifier of secondary fluorescent light detecting photodiode 160. Electrical bandpass filter 750 may be an eight-pole Butterworth bandpass filter with a bandpass of plus and minus 2 kHz, for example. FIG. 14 shows details of the analog input circuitry of FIG. 13, from secondary fluorescent light detecting photodiode 160, including electrical bandpass filter 750.

Characteristics of the bandpass filter may be matched to the application requirements for detection speed and modulation frequency. Combining precise frequency control and narrow bandpass electrical filtering improves the signal/noise ratio of the optical front end of the authentication reader, thus allowing higher amplifier gains without saturating the amplifiers with noise. The narrow bandpass filter can also be adapted to match the characteristics of a particular fluorescent material used to mark authentic articles, for example the time delays of fluorescent emission and extinction, time shift from first order to second order emission, etc. A series of filter frequency and bandwidth settings and amplifier gain settings may be arranged to be selectable and tunable for various applications. Selection of the filters and gains may be made manually by means of switches or jumpers, or may be made programmable by microcomputer-controlled relays operated according to a program in the computer.

Figure 15:
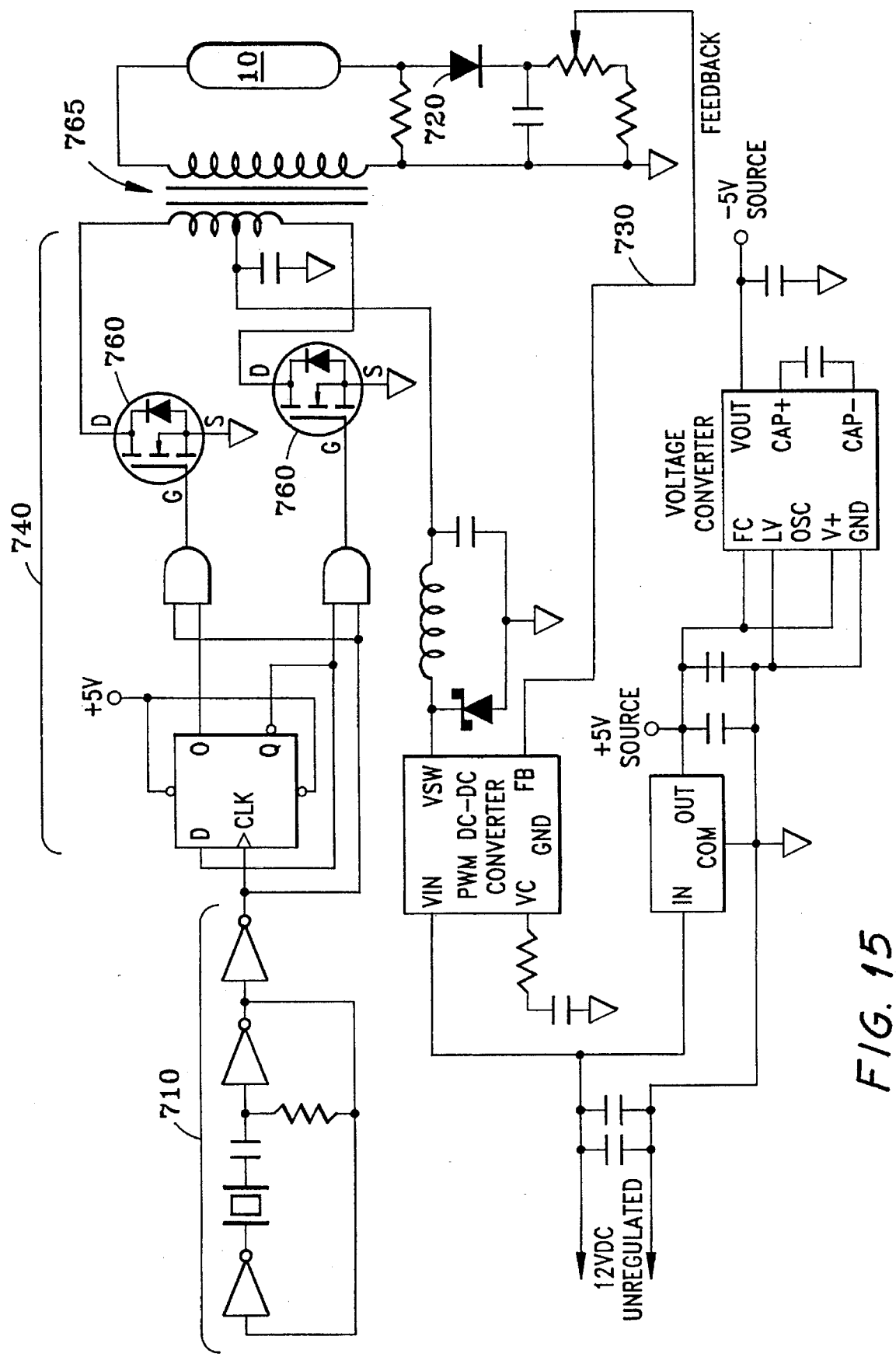
FIG. 15 shows an electrical schematic diagram of another portion of a preferred embodiment.

FIG. 15 shows details of the power supply and driver circuit section of FIG. 13. Inverter 740 is preferably a push-pull inverter using power MOSFET transistors to drive a transformer 765, used to step up the voltage to drive ultraviolet light source 10. It should be noted that the push-pull stage has a dead time (both MOSFET's off) between successive pulses. Logic is used in inverter 740 to generate this "pulse-skipping" feature of the inverter. This is done so that source 10 "re-assembles" a 32 kHz optical output pulse train (15.26 microseconds ON and 15.26 microseconds OFF) indicated by reference numeral 770 in FIG. 13. Among other advantages, the increased area under the square-wave of the waveform provides increased ultraviolet light output compared with a sinusoidal waveform. Also the 50% duty cycle of the transformer reduces transformer temperature, resulting in more stable light output. The automatic gain control provided by feedback from a photodiode responsive to the lamp output makes it possible to maintain more constant brightness as the lamp ages. A brightness control in the feedback portion of the circuit can be used to compensate for lamp-to-lamp brightness variations. Feedback from photodetector 720 is the preferred method of source light output control. An alternative but indirect method of brightness control is to sense the current through source 10, and to control the inverter for constant current. The two methods may also be combined.

Figure 16:
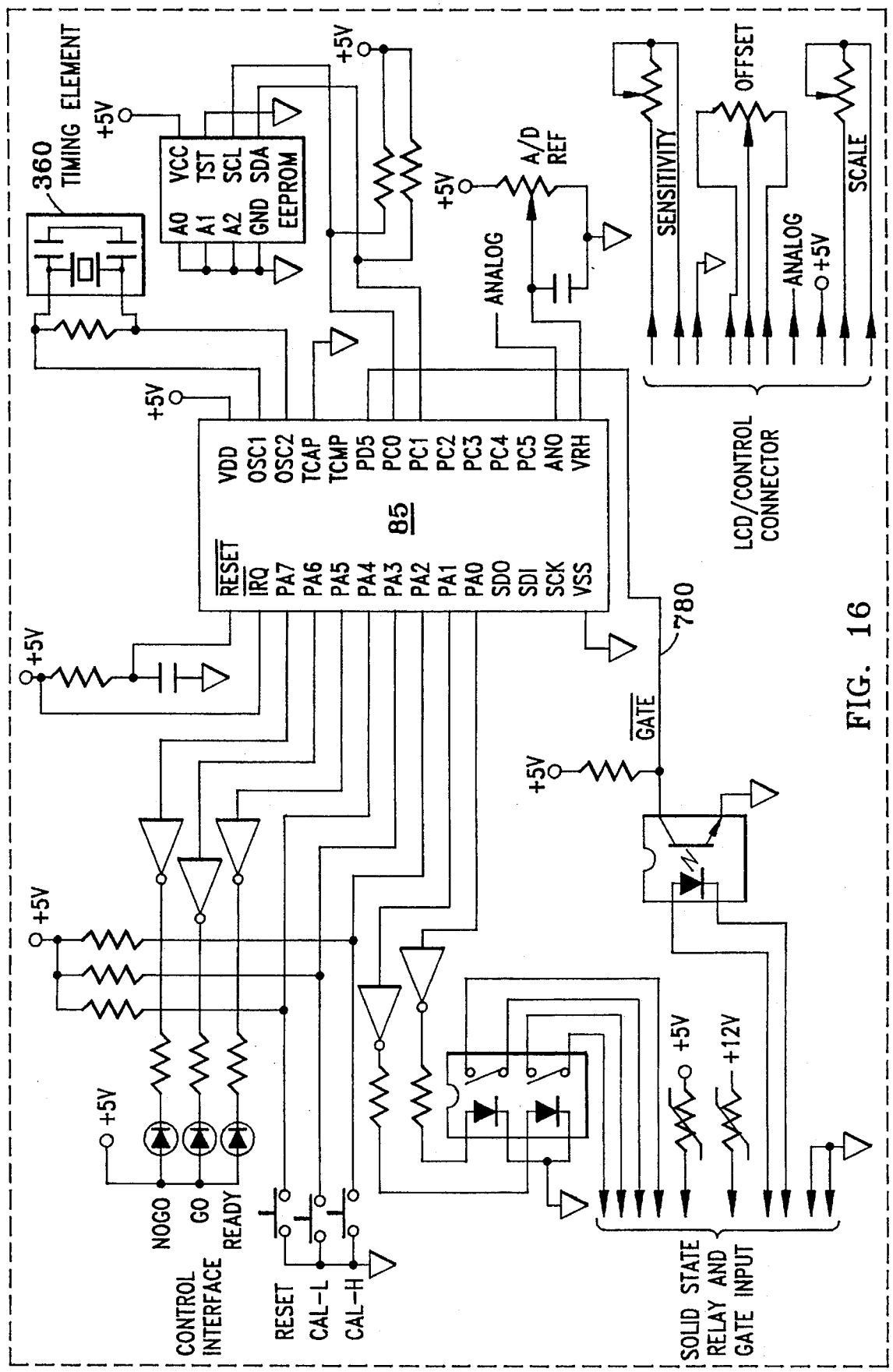
FIG. 16 shows an electrical schematic diagram of a third portion of a preferred embodiment.

Another feature of the improved electronics of FIG. 13, adapting the fluorescence authentication reader for integration with other readers as in FIG. 6, is GATE input 780 to microcomputer 85. GATE input 780 as shown in more detail in FIG. 16, is a timing input and is preferably made optically isolated to accommodate various signal characteristics of other readers and to assure compatibility. Any suitable signal provided to the authentication reader at its GATE input from the other readers may be used by microcomputer 85 to synchronize its operation, including the timing of any output signal to be sent to the other readers. In an alternative method of synchronizing readers in an authentication system having multiple readers, all the readers may be controlled by a common external signal. In that case the common external signal is applied to GATE input 780 as well as to other readers. For timing synchronization, the program controlling microcomputer 85 is preferably made responsive to a transition at GATE input 780. The signal level at GATE input 780 may also be used as a logical input to the program controlling microcomputer 85. Thus the fluorescence authentication reader having an integral GATE input 780 and a computer 85 suitably programmed to be responsive to that input is easily integrated with other readers in a multi-reader authentication system. The scanning of an article and the sending of an output to another reader or the reception of an input from another reader can be readily synchronized via the integral GATE signal 780. Another advantageous application of synchronized multiple fluorescence readers is the parallel or cascaded scanning of a web or other wide-area article.

For clarity, the various novel features of various subsystems of the fluorescence authentication system have been described separately in this disclosure. When these various subsystem features are combined in the whole system of the authentication reader, however, they cooperate to provide an authentication system with extremely sensitive, fast, stable, and repeatable authentication performance that is readily adaptable to various applications. The combination of improved optics and electronics cooperate in enhancing signal/noise ratio by illuminating the articles to be authenticated with brighter, more consistent ultraviolet illumination, which in turn causes emission of secondary fluorescent light detected more reliably at high speeds. The resultant more stable triggering of the authentication output of the individual fluorescence reader, combined with time synchronization of the individual fluorescence reader with other readers, provides a reliable integrated multi-reader authentication system.

INDUSTRIAL APPLICABILITY

The improved authentication system and associated methods of this invention may be used to detect counterfeit articles, and to verify the authenticity of security documents, such as bank checks, credit cards, driver's licenses, identification cards, passports, currency, and legal documents such as wills and contracts. The invention is particularly applicable to detection of counterfeit documents or other counterfeit products and detection of documents or other products which have been subjected to tampering, forging, or other unauthorized modification. The authentication system may be used to sort authenticated from non-authenticated articles, and may optionally be used, under some circumstances, to trigger confiscation or destruction of unauthenticated articles, e.g. counterfeit credit cards or the like. Alternatively, under some circumstances, the sorted unauthenticated articles may be visibly marked by optional marking means to prevent their continued unauthorized use. Some other examples of applications include label verification, safety seal verification, article alignment, and sorting of articles into two or more categories. Other applications include quality control in manufacturing where the presence or quantity of particular materials is important. For example, predetermined fluorescent substances are added in small percentages to tag other materials, which may be non-fluorescent, and the authentication system may be used to provide statistical information about the presence and quantities of the tagged materials, while associated readers in a multiple-reader system can further characterize or individually identify the tested articles.

From the foregoing description, one skilled in the art can easily ascertain the essential characteristics of this invention, and without departing from the spirit and scope thereof, can make various changes and modifications of the invention to adapt it to various usages and conditions. Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, it will be appreciated from the foregoing descriptions of the invention that many other combinations of discrimination criteria may be programmed into the authentication system described, and that readers of types other than those listed may be combined in an authentication system, each having an output evaluated according to appropriate discrimination criteria. Similar modifications may be made that are appropriate to quality control applications of the disclosed apparatus and methods. It is intended that the specification and examples be considered as exemplary only, with the true scope and spirit of the invention being defined by the following claims.

Having described our invention, we claim:

1. An authentication system for discriminating among articles marked with one or more fluorescent substances which emit fluorescent light in response to electromagnetic radiation, comprising:

a) a source of electromagnetic radiation in at least one of the ultraviolet, visible, and infrared spectral ranges;

b) means for modulating said electromagnetic radiation at a frequency of more than about 25 kHz;

c) means for synchronously detecting said fluorescent light at said modulation frequency to produce an analog signal;

d) first optical means for transmitting said electromagnetic radiation from said source toward said articles;

e) second optical means for transmitting said fluorescent light toward said means for synchronously detecting said fluorescent light, wherein said first and second optical means are adapted to be substantially coaxial;

f) conversion means to convert said analog signal to a first digital signal;

g) comparison means comparing said first digital signal with a predetermined second digital signal to within a predetermined tolerance; and h) output means indicating a positive authentication result if said first and second digital signals agree to within said tolerance, and otherwise indicating a negative authentication result.

2. An authentication system as recited in claim 1, wherein said comparison means comprises a computer operable by a predetermined program to control said output means according to said authentication results.

3. An authentication system as recited in claim 2, further comprising at least one additional detector having an output, said output of said at least one additional detector being responsive to indicia selected from the list consisting of:
   a) magnetic indicia,
   b) holographic indicia,
   c) visible characters, and
   d) visible bar codes.

4. An authentication system as recited in claim 1, wherein said first and second optical means each comprises at least one light guide.

5. An authentication system as recited in claim 1, wherein said first and second optical means each comprises at least one lens.

6. An authentication system as recited in claim 2, further comprising a reader adapted to read indicia, said reader having a reader output, and wherein said computer is adapted to receive said first digital signal and said reader output and to produce an authentication result depending on whether or not said digital signal and said reader output agree with predetermined codes.

7. An authentication system as recited in claim 2, further comprising a magnetic stripe reader having a digital output, wherein said magnetic stripe reader digital output is connected to said computer to provide information used by said predetermined program to produce said digital outputs indicating authentication or lack of authentication.

8. An authentication system as recited in claim 3, wherein said output of said at least one additional detector is connected to said computer to provide information used by said predetermined program to produce said digital outputs indicating authentication or lack of authentication.

9. An authentication system as recited in claim 4, wherein said first optical means comprises a single light guide and said second optical means comprises a plurality of light guides disposed around said first optical means.

10. An authentication system as recited in claim 4, wherein said second optical means comprises a single light guide and said first optical means comprises a plurality of light guides disposed around said first optical means.

11. An authentication system as recited in claim 5, wherein said first optical means comprises a single lens and said second optical means comprises a plurality of lenses disposed around said first optical means.

12. An authentication system as recited in claim 5, wherein said second optical means comprises a single lens and said first optical means comprises a plurality of lenses disposed around said first optical means.

13. An authentication system as recited in claim 5, wherein said first optical means comprises a single lens and said second optical means comprises an annular lens disposed around said first optical means.

14. An authentication system as recited in claim 5, wherein said second optical means comprises a single lens and said first optical means comprises an annular lens disposed around said first optical means.

15. An authentication system for discriminating among articles marked with one or more fluorescent substances which emit fluorescent light in response to electromagnetic radiation, comprising:
   a) a source of electromagnetic radiation in at least one of the ultraviolet, visible, and infrared spectral ranges;
   b) a driver circuit adapted to energize said source at a predetermined frequency, said driver circuit further comprising at least one crystal, and said predetermined frequency being determined by said at least one crystal;
   c) first optical means for transmitting said electromagnetic radiation from said source toward said articles;
   d) second optical means for transmitting said fluorescent light toward at least one detector capable of producing a first analog signal responsive to said fluorescent light, said first and second optical means being adapted to be substantially coaxial;
   e) wavelength-selective means disposed to allow selected portions of said spectral ranges to illuminate said detector;
   f) amplifier means adapted to synchronously detect said first analog signal at said predetermined frequency;
   g) an electrical bandpass filter adapted to pass said predetermined frequency and to remove selected other frequencies from said first analog signal to produce a second analog signal;
   h) an analog-to-digital converter converting said second analog signal to a digital signal,
   i) a computer operating under a predetermined program and comparing said digital signal to one or more predetermined digital signals, said computer being adapted to discriminate between said marked articles and other articles not so marked, and
   j) digital output means responsive to said computer to indicate authentication or lack of authentication of said articles to be discriminated.

16. An authentication system as recited in claim 15, wherein said first and second optical means each comprises at least one light guide.

17. An authentication system as recited in claim 15, wherein said first and second optical means each comprises at least one lens.

18. An authentication system as recited in claim 16, wherein said first optical means comprises a single light guide and said second optical means comprises a plurality of light guides disposed around said first optical means.

19. An authentication system as recited in claim 16, wherein said second optical means comprises a single light guide and said first optical means comprises a plurality of light guides disposed around said first optical means.

20. An authentication system as recited in claim 17, wherein said first optical means comprises a single lens and said second optical means comprises a plurality of lenses disposed around said first optical means.

21. An authentication system as recited in claim 17, wherein said second optical means comprises a single lens and said first optical means comprises a plurality of lenses disposed around said first optical means.

22. An authentication system as recited in claim 13, wherein said first and second optical means are integrated into a single coaxial optical element.

23. An authentication system as recited in claim 14, wherein said first and second optical means are integrated into a single coaxial optical element.

24. An authentication system as recited in claim 20, wherein said first and second optical means are integrated into a single coaxial optical element.

25. An authentication system as recited in claim 21, wherein said first and second optical means are integrated into a single coaxial optical element.

26. An authentication system as recited in claim 1, wherein said means for modulating said electromagnetic radiation comprises a) a crystal-controlled oscillator adapted to be operated at a frequency of more than about 25 kHz, b) a photodetector adapted to be responsive to said electromagnetic radiation, said photodetector having a feedback output, and c) an inverter energizing said source of electromagnetic radiation, said inverter being controlled both by said crystal-controlled oscillator and by said feedback output of said photodetector.

27. An authentication system as recited in claim 1, wherein said means for synchronously detecting said fluorescent light includes an electrical bandpass filter passing said frequency.

28. An authentication system as recited in claim 1, wherein said comparison means includes means responsive to a timing signal to time at least said authentication results.

29. An authentication system as recited in claim 2, wherein said computer further comprises an input responsive to a timing signal to time at least said authentication results.

30. An authentication system as recited in claim 6, wherein said reader is further adapted to be have a synchronizing output, and wherein said computer is adapted to receive said synchronizing output to control the timing of at least said authentication result.

31. An authentication system as recited in claim 1, wherein said computer is further adapted to be responsive to a timing signal to control timing of at least said digital output means.

32. An authentication system as recited in claim 26, wherein said means for synchronously detecting said fluorescent light further comprises a lock-in amplifier controlled by said crystal-controlled oscillator.

33. An authentication system as recited in claim 27, wherein said electrical bandpass filter has a bandwidth of plus and minus about 2 kHz around said frequency.

34. An authentication system, comprising a) a first reader adapted to read first indicia printed with a substance that emits fluorescent light when illuminated with ultraviolet light, said first reader having a first output, and said first reader comprising:

i) a source of electromagnetic radiation in at least one of the ultraviolet, visible, and infrared spectral ranges;

ii) a crystal-controlled oscillator adapted to be operated at a predetermined frequency of more than about 25 kHz;

iii) a first photodetector adapted to be responsive to said electromagnetic radiation, said first photodetector having a feedback output;

iv) an inverter adapted to energize said source of electromagnetic radiation with a square-wave waveform having a 50% duty cycle, said inverter being controlled both by said crystal-controlled oscillator and by said feedback output of said first photodetector;

v) first optical means for transmitting said electromagnetic radiation from said source toward said first indicia;

vi) second optical means for transmitting said fluorescent light toward at least one second photodetector capable of producing a first analog signal responsive to said fluorescent light, said first and second optical means being adapted to be substantially coaxial;

vii) at least one wavelength-selective means disposed to allow selected portions of said spectral ranges to illuminate said second photodetector;

viii) amplifier means adapted to synchronously detect said first analog signal at said predetermined frequency;

ix) an electrical bandpass filter adapted to pass said predetermined frequency and to remove selected other frequencies from said first analog signal to produce a second analog signal;

x) an analog-to-digital converter converting said second analog signal to a first digital signal, xi) comparison means comparing said first digital signal with a predetermined second digital signal to within a predetermined tolerance to discriminate between said first indicia and other indicia; and xii) digital output means responsive to said comparison means to provide said first output;

(b) at least a second reader adapted to read second indicia, said second reader having a second output, at least one of said first and second readers being adapted to provide a synchronizing signal; and (c) a computer responsive to said synchronizing signal and adapted by being programmed to receive said first and second outputs respectively from said first and second readers, to decode said first and second indicia, and to produce an authentication result depending on whether or not said first and second indicia agree with predetermined indicia codes.

* * * * *